(12) United States Patent
Kim et al.

(10) Patent No.: US 11,991,741 B2
(45) Date of Patent: May 21, 2024

(54) ELECTRONIC DEVICE FOR MANAGING COEXISTENCE OF MULTIPLE COMMUNICATION SCHEMES AND OPERATING METHOD THEREOF

(71) Applicant: SAMSUNG ELECTRONICS CO., LTD., Suwon-si (KR)

(72) Inventors: Geonwoo Kim, Suwon-si (KR); Sehwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/200,010

(22) Filed: May 22, 2023

(65) Prior Publication Data
US 2023/0300875 A1    Sep. 21, 2023

Related U.S. Application Data

(63) Continuation of application No. 17/096,002, filed on Nov. 12, 2020, now Pat. No. 11,665,731.

(30) Foreign Application Priority Data

Nov. 13, 2019  (KR) .................. 10-2019-0145069

(51) Int. Cl.
*H04W 72/10*   (2009.01)
*H04W 72/04*   (2023.01)
(Continued)

(52) U.S. Cl.
CPC ....... *H04W 72/56* (2023.01); *H04W 72/0453* (2013.01); *H04W 76/15* (2018.02); *H04W 88/06* (2013.01)

(58) Field of Classification Search
CPC . H04W 72/1242; H04W 76/20; H04W 80/06; H04W 88/00
See application file for complete search history.

(56) References Cited

U.S. PATENT DOCUMENTS 7,352,332 B1   4/2008   Betts-Lacroix et al.
9,226,311 B2   12/2015  Thoukydides
(Continued)

FOREIGN PATENT DOCUMENTS

CN   101874386 A   10/2010
CN   103270703 A   8/2013
(Continued)

OTHER PUBLICATIONS

Korean Office Action dated Aug. 7, 2023 for KR Application No. 10-2019-0145069.
(Continued)

*Primary Examiner* — Joshua L Schwartz
(74) *Attorney, Agent, or Firm* — Nixon & Vanderhye P.C.

(57) ABSTRACT

Various embodiments relate to an apparatus and a method for managing coexistence of multiple communication schemes by an electronic device. The electronic device may include: a first communication circuit configured to support a first frequency band; a second communication circuit configured to support at least a part of the first frequency band and a second frequency band; a first switch connected to the first communication circuit; a second switch connected to the second communication circuit and the first switch; a first antenna connected to the first switch and configured to support the first frequency band; and a second antenna connected to the second switch and configured to support the second frequency band, wherein based on the second communication circuit using the first frequency band, the second communication circuit is configured to control the first switch and the second switch to selectively connect the first antenna to one of the first communication circuit or the second communication circuit.

20 Claims, 15 Drawing Sheets

(51) Int. Cl.
  *H04W 72/0453*  (2023.01)
  *H04W 72/56*  (2023.01)
  *H04W 76/15*  (2018.01)
  *H04W 88/06*  (2009.01)

(56) References Cited

U.S. PATENT DOCUMENTS

| | | | |
|---|---|---|---|
| 9,801,073 | B2 | 10/2017 | Cordeiro et al. |
| 11,665,731 | B2 | 5/2023 | Kim et al. |
| 2004/0147223 | A1* | 7/2004 | Cho .................. H04L 12/66 455/552.1 |
| 2005/0232193 | A1* | 10/2005 | Jorgensen ............ H04L 1/20 370/341 |
| 2005/0239497 | A1* | 10/2005 | Bahl .................. H04W 88/06 455/552.1 |
| 2006/0025171 | A1 | 6/2006 | Ly et al. |
| 2006/0165155 | A1 | 7/2006 | Liu et al. |
| 2008/0279138 | A1* | 11/2008 | Gonikberg ......... H04W 88/06 370/328 |
| 2008/0318630 | A1* | 12/2008 | Gil .................. H04W 72/1215 455/561 |
| 2009/0081962 | A1 | 3/2009 | Sohrabi |
| 2009/0147763 | A1 | 6/2009 | Desai et al. |
| 2010/0026547 | A1 | 2/2010 | Weissman et al. |
| 2012/0149301 | A1 | 6/2012 | Wiley |
| 2013/0308554 | A1 | 11/2013 | Ngai et al. |
| 2015/0133185 | A1 | 4/2015 | Chen et al. |
| 2017/0070918 | A1* | 3/2017 | Zhou .................. H04B 1/525 |
| 2017/0086319 | A1 | 3/2017 | Ochii |
| 2018/0159582 | A1 | 6/2018 | Tseng et al. |
| 2018/0294547 | A1 | 11/2018 | Park et al. |
| 2019/0222280 | A1 | 7/2019 | Shu et al. |

FOREIGN PATENT DOCUMENTS

| | | |
|---|---|---|
| CN | 108233953 A | 6/2018 |
| JP | 2006-310968 | 11/2006 |
| KR | 10-2009-0059063 A | 6/2009 |
| KR | 10-1166731 | 7/2012 |
| KR | 10-2017-0040512 A | 4/2017 |

OTHER PUBLICATIONS

U.S. Appl. No. 17/096,002, filed Nov. 12, 2020; Kim et al.
European Office Action dated Mar. 7, 2023 for EP Application No. 20207186.6.
International Search Report dated Feb. 18, 2021 in corresponding International Application No. PCT/KR2020/015979.
European Search Report and Written Opinion dated Mar. 31, 2021 in European Application No. 20207186.6.
Nikhil Vijay Kajale, "UWB and WLAN Coexistence: a Comparison of Interference Reduction Techniques", Graduate Theses and Dissertations, University of South Florida, 2005 [retrieved on Jan. 25, 2021]. Retrieved from <URL: https://scholarcommons.usf.edu/etd/713/>.
Chinese Office Action dated Apr. 10, 2024 for CN Application No. 202011267896.1.

* cited by examiner

ELECTRONIC DEVICE FOR MANAGING COEXISTENCE OF MULTIPLE COMMUNICATION SCHEMES AND OPERATING METHOD THEREOF

CROSS-REFERENCE TO RELATED APPLICATION

This application is a Continuation of U.S. application Ser. No. 17/096,002, filed Nov. 12, 2020, (U.S. Pat. No. 11,665, 731), which claims priority to KR 10-2019-0145069, filed Nov. 13, 2019, the entire contents of which are all hereby incorporated herein by reference in their entireties.

BACKGROUND

Field

The disclosure relates to an apparatus and a method for managing coexistence of multiple communication schemes by an electronic device.

Description of Related Art

With the development of wireless communication technologies, an electronic device (e.g., an electronic device for communication) is commonly used in daily life, and thus the level of user demand has increased. Various types of wireless communication technologies are used to meet the level of user demand. For example, wireless communication technology may include at least one of ultra-wideband (UWB) communication, wireless fidelity (Wi-Fi) communication, long term evolution (LTE) communication, 5G communication (or new radio (NR) communication), or Bluetooth communication.

A frequency resource used for wireless communication by an electronic device may be limited. Accordingly, in at least a part of a plurality of wireless communication schemes available by an electronic device, at least a part of frequency bands may overlap. For example, a UWB communication scheme may support a frequency band of 6.25 GHz to 8.25 GHz. A wireless fidelity (Wi-Fi) communication scheme may support a frequency band of 2.4 GHz to 2.5 GHz and a frequency band of 5.15 GHz to 7.15 GHz. For example, in the UWB communication scheme and the Wi-Fi communication scheme, a frequency band of 6.25 GHz to 7.15 GHz may overlap.

When an electronic device simultaneously uses wireless communication schemes in which frequency bands overlap, communication quality may deteriorate or communication failure may occur due to communication interference between the schemes.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an apparatus and a method for securing, by an electronic device, performance of multiple communication schemes in which frequency bands overlap.

According to various example embodiments, an electronic device may include: a first communication circuit configured to support a first frequency band; a second communication circuit configured to support at least a part of the first frequency band and a second frequency band; a first switch connected to the first communication circuit; a second switch connected to the second communication circuit and the first switch; a first antenna connected to the first switch and configured to support the first frequency band; and a second antenna connected to the second switch and configured to support the second frequency band, wherein based on the second communication circuit using the first frequency band, the second communication circuit is configured to control the first switch and the second switch to selectively connect the first antenna to one of the first communication circuit or the second communication circuit.

According to various example embodiments, a method of operating an electronic device including a first communication circuit configured to support a first frequency band, and a second communication circuit operatively connected to the first communication circuit and configured to support at least a part of the first frequency band and a second frequency band may include: identifying, by the second communication circuit, whether the second communication circuit uses the first frequency band; and based on the second communication circuit using the first frequency band, selectively connecting a first antenna configured to support the first frequency band with one of the first communication circuit or the second communication circuit.

According to various example embodiments, an electronic device may include: a first communication circuit configured to support a first frequency band; a second communication circuit configured to support at least a part of the first frequency band and a second frequency band; a first switch connected to the first communication circuit; a second switch connected to the second communication circuit and the first switch; a first antenna connected to the first switch and configured to support the first frequency band; a second antenna connected to the second switch and configured to support the second frequency band; and a processor operatively connected to the first communication circuit and the second communication circuit, wherein based on the second communication circuit using the first frequency band, at least one of the first communication circuit, the second communication circuit, and the processor is configured to control the first switch and the second switch to selectively connect the first antenna to one of the first communication circuit or the second communication circuit.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the accompanying drawings.

According to various embodiments, an electronic device may support a first communication scheme and a second communication scheme, wherein at least parts of frequency bands of the communication schemes overlap. For example, and without limitation, the first communication scheme or the second communication scheme may include a ultra-wideband (UWB) communication scheme (e.g., 6 GHz to 8.5 GHz), a wireless fidelity (Wi-Fi) communication scheme (e.g., 2.4 GHz to 7.15 GHz), a long term evolution (LTE) communication scheme (e.g., 800 MHz to 2.6 GHz), a 5G communication scheme (e.g., 400 MHz to 7.5 GHz), or the like. However, the disclosure is not limited thereto, and the first communication scheme and the second communication scheme may include other communication technologies in which at least parts of frequency bands overlap.

Figure 1:
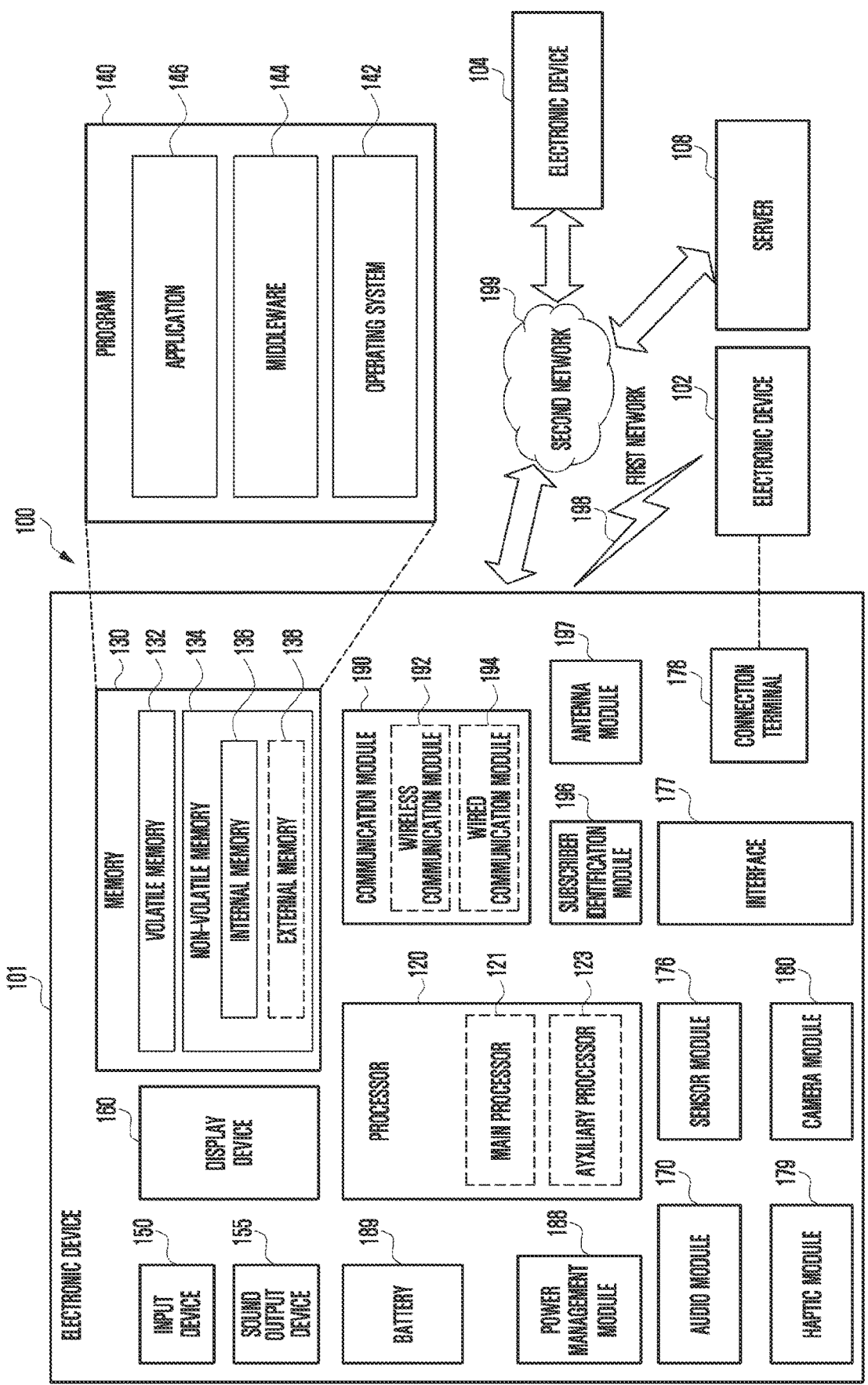
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
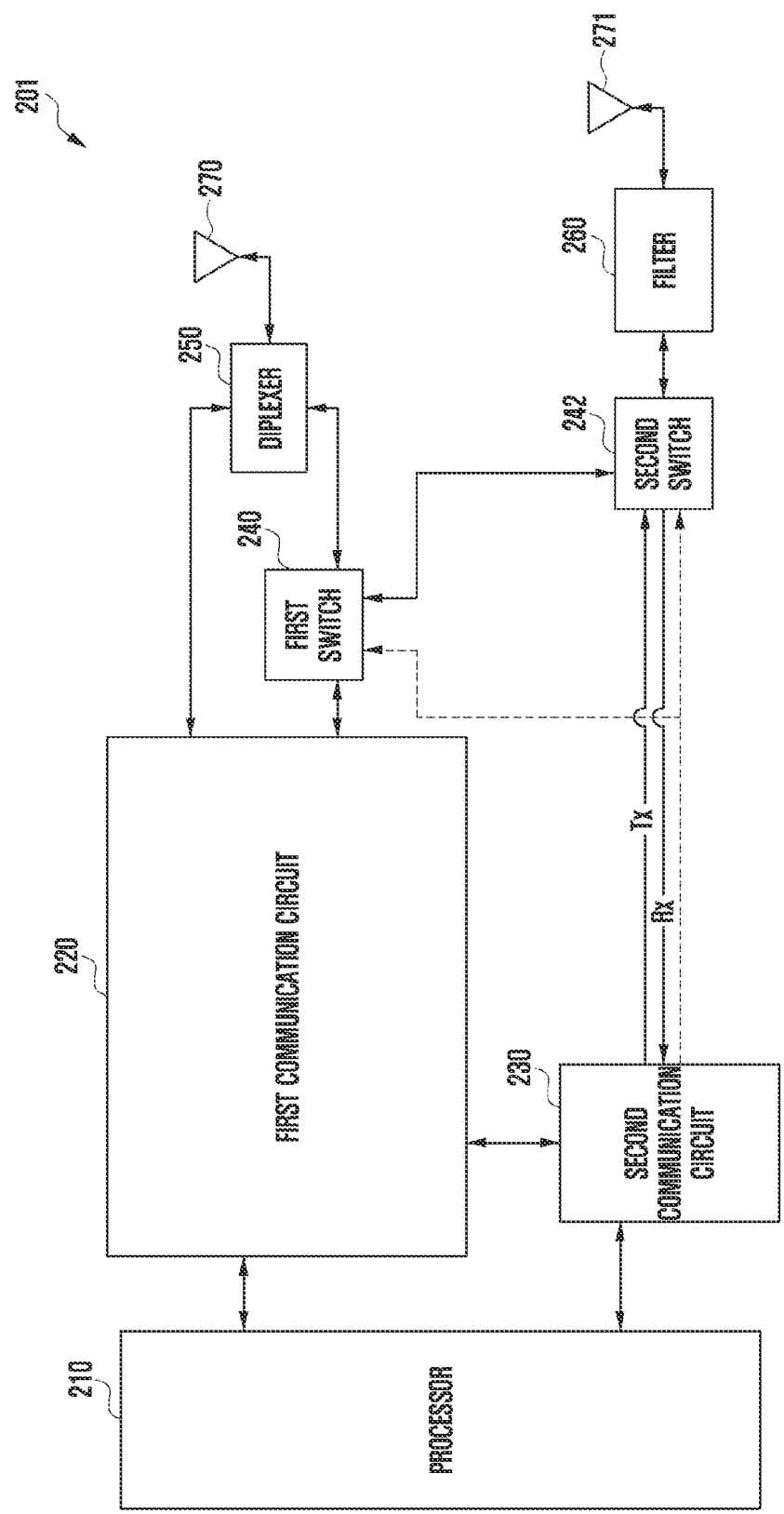
FIG. 2A is a block diagram illustrating an example electronic device for coexistence of a first communication scheme and a second communication scheme according to various embodiments.
Figure 2B:
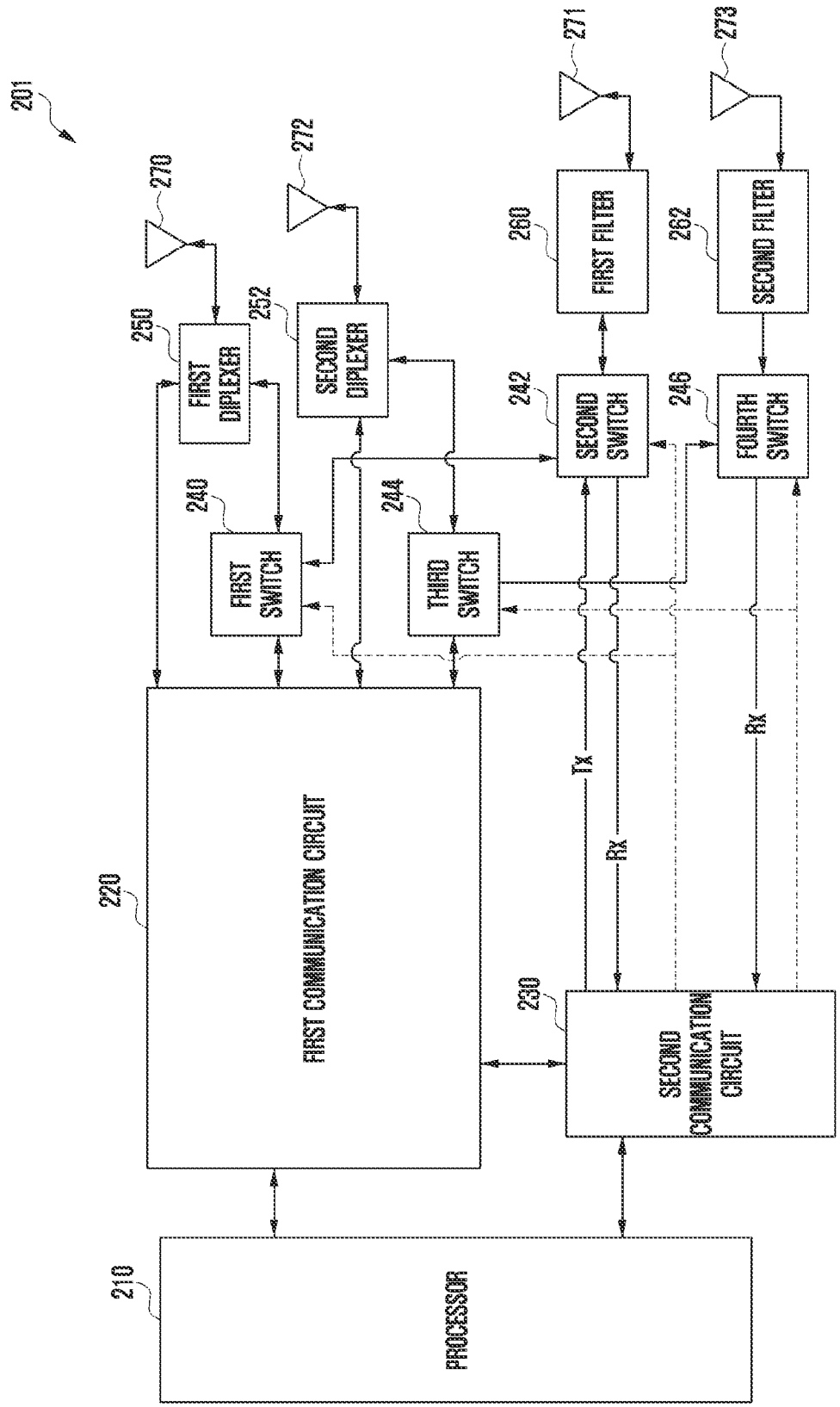
FIG. 2B is a block diagram illustrating an example electronic device for coexistence of a first communication scheme and a second communication scheme according to various embodiments.
Figure 2C:
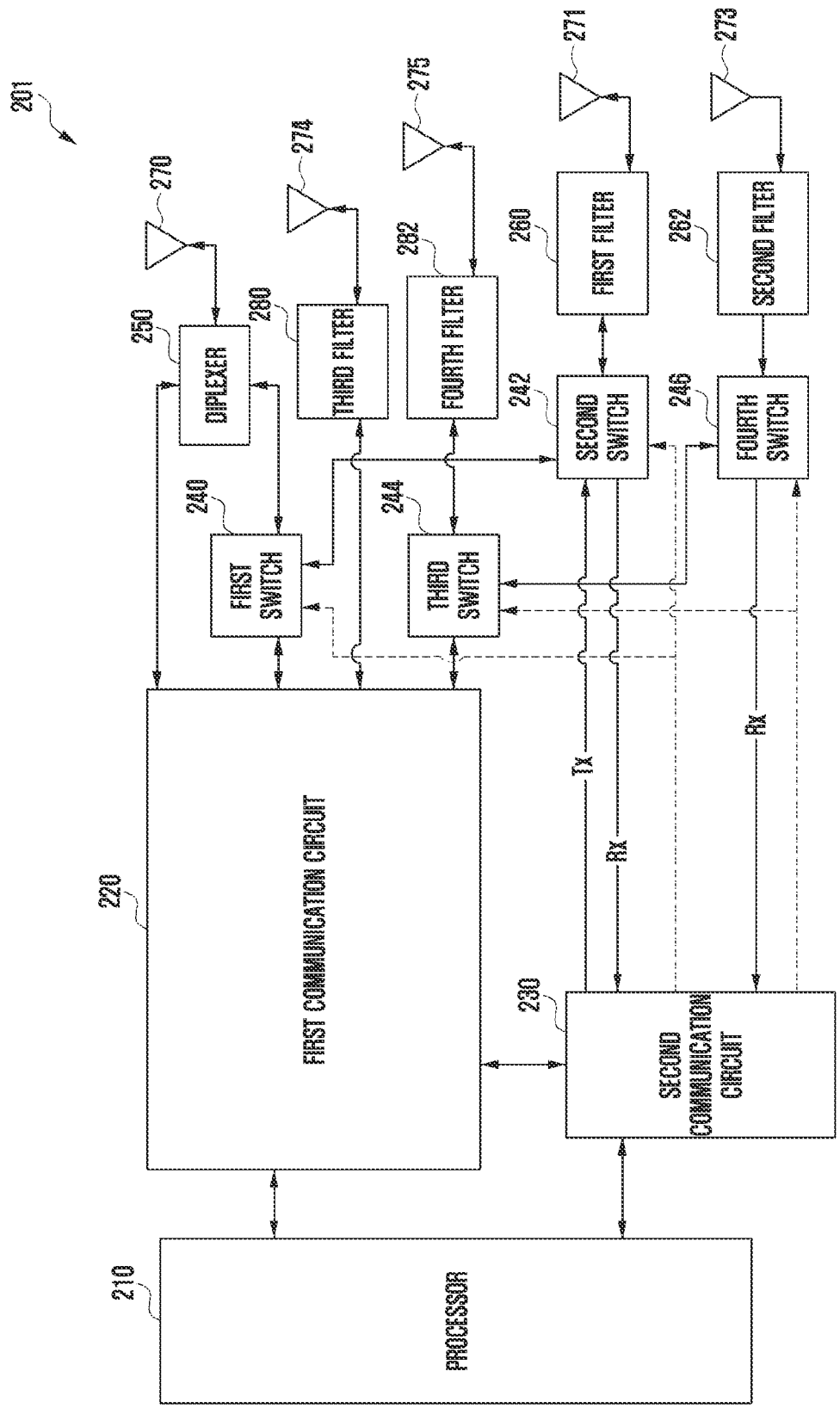
FIG. 2C is a block diagram illustrating an example electronic device for coexistence of a first communication scheme and a second communication scheme according to various embodiments.
Figure 2D:
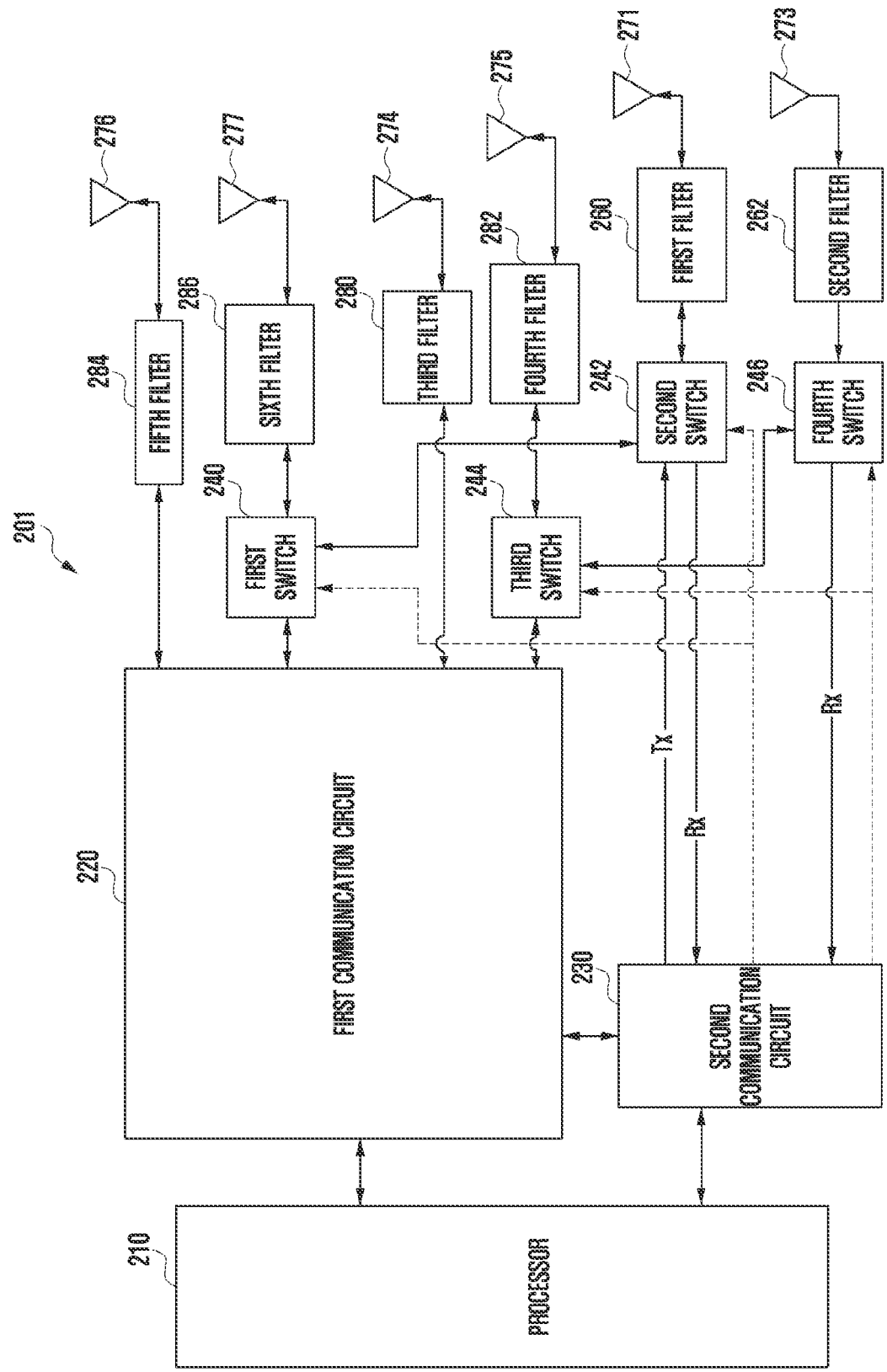
FIG. 2D is a block diagram illustrating an example electronic device for coexistence of a first communication scheme and a second communication scheme according to various embodiments.
Figure 2E:
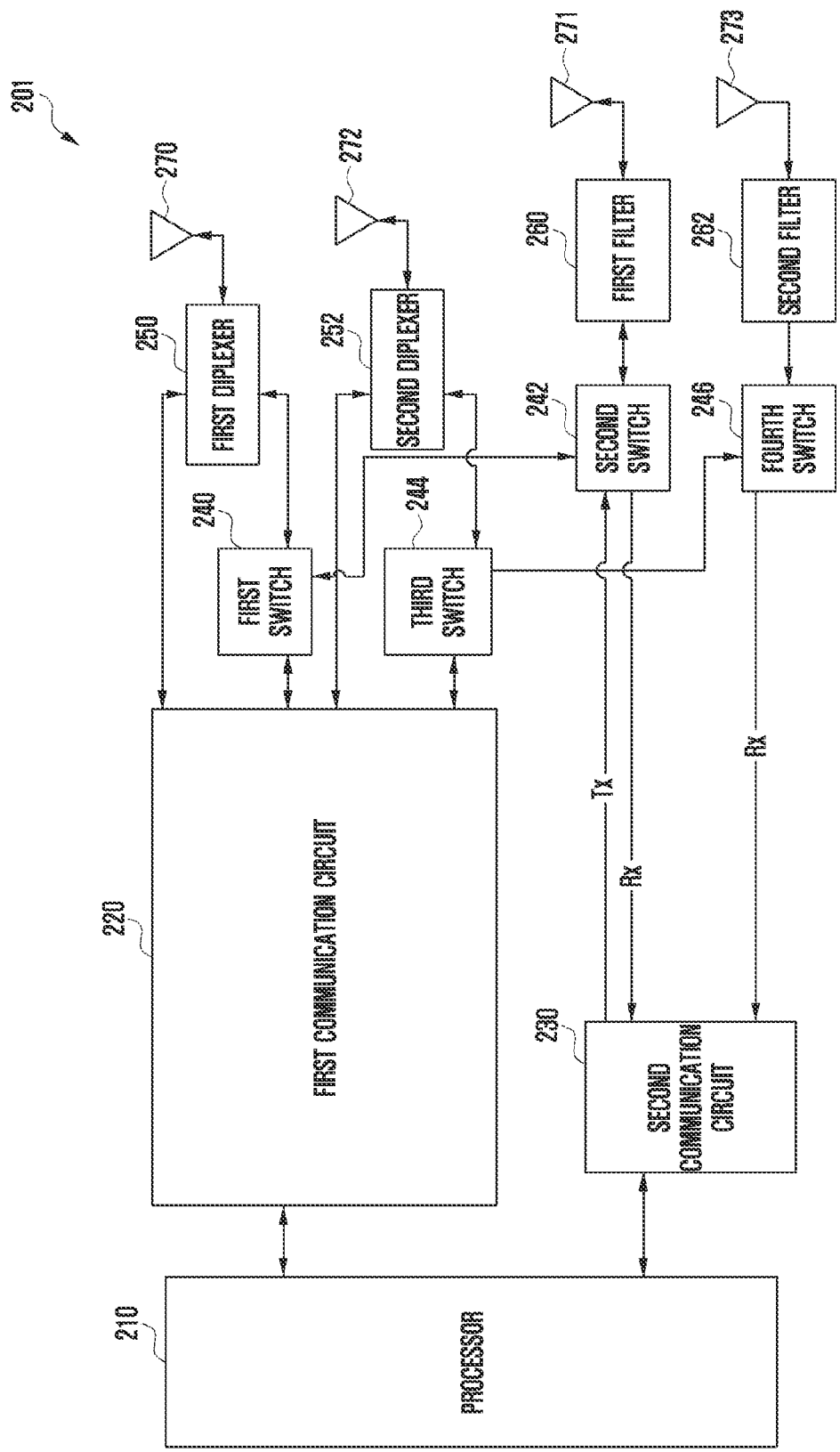
FIG. 2E is a block diagram illustrating an example electronic device for coexistence of a first communication scheme and a second communication scheme according to various embodiments.
Figure 2F:
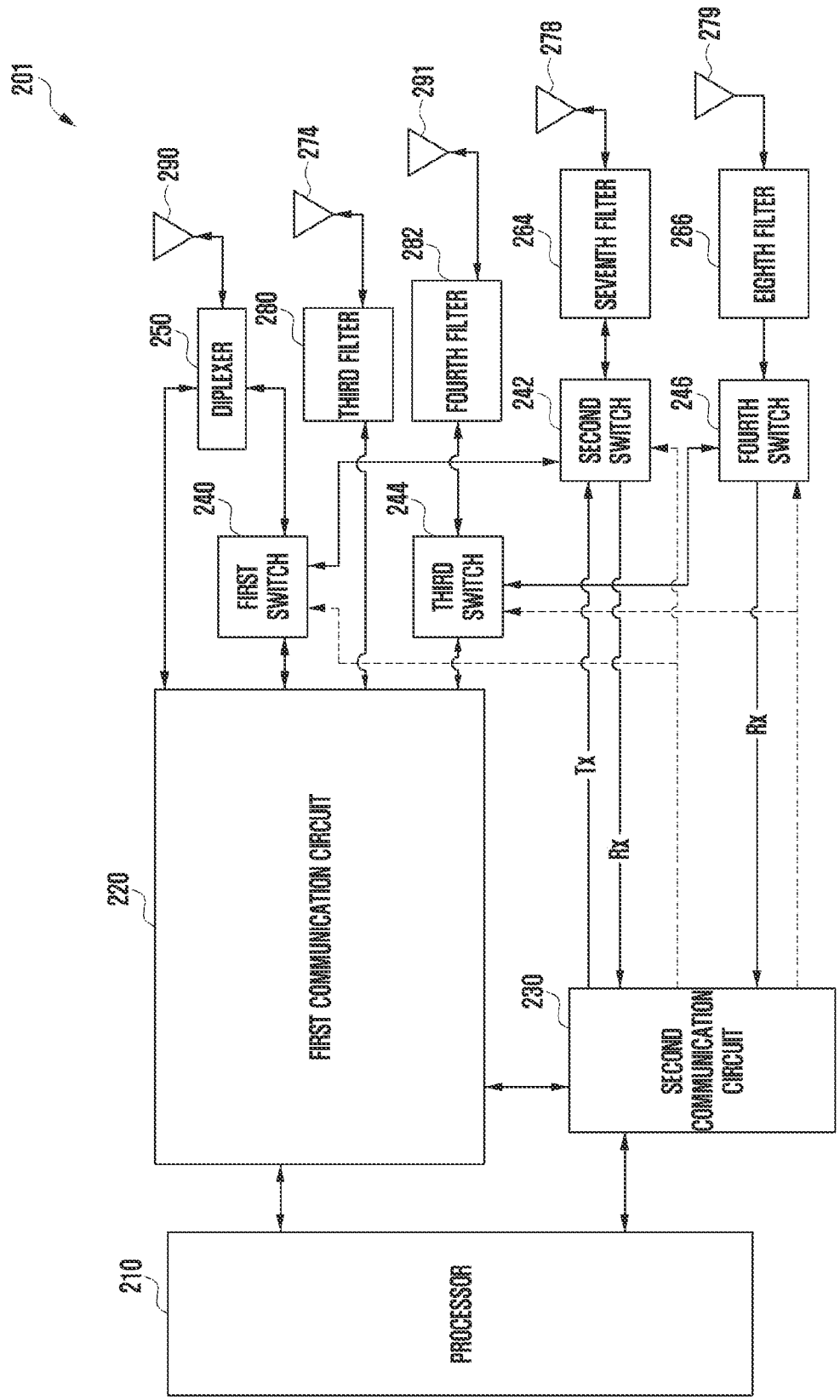
FIG. 2F is a block diagram illustrating an example electronic device for coexistence of a first communication scheme and a second communication scheme according to various embodiments.

FIG. 2A is a block diagram illustrating an example electronic device for coexistence of a first communication scheme and a second communication scheme according to various embodiments, FIG. 2B is a block diagram illustrating an example electronic device for coexistence of a first communication scheme and a second communication scheme according to various embodiments, FIG. 2C is a block diagram illustrating an example electronic device for coexistence of a first communication scheme and a second communication scheme according to various embodiments, FIG. 2D is a block diagram illustrating an example electronic device for coexistence of a first communication scheme and a second communication scheme according to various embodiments, FIG. 2E is a block diagram illustrating an example electronic device for coexistence of a first communication scheme and a second communication scheme according to various embodiments, and FIG. 2F is a block diagram illustrating an example electronic device for coexistence of a first communication scheme and a second communication scheme according to various embodiments.

Referring to FIG. 2A, an electronic device 201 may include a processor (e.g., including processing circuitry) 210, a first communication circuit 220, a second communication circuit 230, a plurality of switches 240 and 242, a diplexer 250, a filter 260, and/or a plurality of antennas 270 and 271.

According to an embodiment, the processor 210 may be substantially the same as or similar to the processor 120 of FIG. 1 or may be included in the processor 120. According to an embodiment, the first communication circuit 220 and the second communication circuit 230 may be substantially the same as or similar to a wireless communication module 192 or may be included in the wireless communication module 192. According to an embodiment, the plurality of antennas 270 and 271 may be substantially the same as or similar to an antenna module 197 or may be included in the antenna module 197.

According to various embodiments, the processor 210 may include various processing circuitry and control at least one other component (e.g., a hardware or software component) of the electronic device 201. According to an embodiment, when the occurrence of an event (e.g., an active event) related to the second communication circuit 230 is detected, the processor 210 may transmit information related to the event to the second communication circuit 230. For example, the information related to the event may include at least one of information (e.g., a service type) related to a service provided through the second communication circuit 230 or an active signal of the second communication circuit 230. For example, the processor 210 may determine whether an event (e.g., an active event) related to the second communication circuit 230 occurs, through Bluetooth or Bluetooth low energy (BLE). For example, the processor 210 may be connected to the first communication circuit 220 through a peripheral component interconnect express (PCIe) interface. For example, the processor 210 may be connected to the second communication circuit 230 through a serial peripheral interface (SPI).

According to various embodiments, the first communication circuit 220 may, for example, and without limitation, support a first frequency band (e.g., 2.4 to 2.5 GHz, or 5.15 to 7.25 GHz) or at least a part (e.g., 2.4 to 2.5 GHz, or 5.15 to 7.15 GHz) of the first frequency band, based on a first communication scheme (e.g., a Wi-Fi communication scheme). According to an embodiment, the first communication circuit 220 may transmit and/or receive data to and/or from an external electronic device (e.g., the electronic device 102 of FIG. 1) through a first antenna 270 configured to support the first frequency band. For example, the first antenna 270 may support a frequency band of 2.4 to 7.25 GHz including the first frequency band.

According to various embodiments, the first communication circuit 220 may determine a communication circuit for using the first antenna 270. According to an embodiment, when the first communication circuit 220 has received information related to a service priority of the second communication circuit 230 from the second communication circuit 230, the first communication circuit 220 may select the first communication circuit 220 or the second communication circuit 230 as a communication circuit for using the first antenna 270, based on the service priority of the second communication circuit 230. For example, when the first communication circuit 220 does not provide a first communication service (e.g., a Wi-Fi communication service), the first communication circuit 220 may determine that the second communication circuit 230 uses the first antenna 270. For example, the first communication circuit 220 may determine that a communication circuit having a relatively high service priority among the first communication circuit 220 and/or the second communication circuit 230 uses the first antenna 270. For example, when service priorities of the first communication circuit 220 and the second communication circuit 230 are the same, the first communication circuit 220 may determine that the first communication circuit 220 and the second communication circuit 230 alternately use the first antenna 270. For example, the first communication circuit 220 may be connected to the second communication circuit 230 through a universal asynchronous receiver/transmitter (UART) interface. However, the disclosure is not limited thereto.

According to various embodiments, the second communication circuit 230 may, for example, and without limitation, support at least a part (e.g., 6.25 to 7.25 GHz) of the first frequency band and a second frequency band (e.g., 7.25 to 8.25 GHz), based on a second communication scheme (e.g., a UWB communication scheme). According to an embodiment, when the second communication circuit 230 uses channel 8 or channel 9, the second communication circuit 230 may transmit and/or receive data to and/or from an external electronic device through a second antenna 271 configured to support the second frequency band. According to an embodiment, when the second communication circuit 230 uses channel 5 or channel 6, the second communication circuit 230 may transmit and/or receive data to and/or from an external electronic device through the first antenna 270 configured to support the first frequency band (e.g., 2.4 to 7.25 GHz). For example, the second antenna 271 may support a frequency band of 7.25 to 8.5 GHz including the second frequency band.

According to various embodiments, the second communication circuit 230 may control a first switch 240 and a second switch 242 such that the first antenna 270 is connected to the first communication circuit 220 or the second communication circuit 230. According to an embodiment, when the second communication circuit 230 uses channel 5 or channel 6 (e.g., 6.25 to 7.25 GHz), the second communication circuit 230 may transmit the information related to the service priority of the second communication circuit 230 to the first communication circuit 220. According to an embodiment, when the first communication circuit 220 determines that the first antenna 270 is connected to the first communication circuit 220, the second communication circuit 230 may control the first switch 240 such that the first antenna 270 is connected to the first communication circuit 220. According to an embodiment, when it is determined that the first antenna 270 is connected to the second communication circuit 230, the second communication circuit 230 may control the first switch 240 and the second switch 242 such that the first antenna 270 is connected to the second communication circuit 230.

According to various embodiments, when a first communication service and a second communication service are not provided, the first switch 240 may connect the first antenna 270 to the first communication circuit 220. According to an embodiment, at least a part (e.g., a 5 GHz band) of the first frequency band supported by the first antenna 270 may be used for licensed assisted access (LAA) of a long term evolution (LTE) communication scheme. Accordingly, when the first communication circuit 220 does not provide the first communication service and the second communication circuit 230 does not provide the second communication service, the first switch 240 may connect the first antenna 270 and the first communication circuit 220 such that the electronic device 201 can support the LAA of the LTE communication scheme using the first communication circuit 220. For example, the first communication service may include a service related to the first communication scheme (e.g., Wi-Fi). The second communication service may include a service related to the second communication scheme (e.g., UWB).

According to various embodiments, the second switch 242 may be configured to connect a transmission/reception path of the second communication circuit 230 with the first antenna 270 (or the first switch 240) or the second antenna 271, based on a control of the second communication circuit 230. According to an embodiment, when the second communication circuit 230 uses channel 8 or channel 9 (e.g., 7.25 to 8.25 GHz), the second switch 242 may connect the transmission/reception path of the second communication circuit 230 with the second antenna 271. According to an embodiment, when the second communication circuit 230 uses channel 5 or channel 6 (e.g., 6.25 to 7.25 GHz), the first switch 240 and the second switch 242 may connect the transmission/reception path of the second communication circuit 230 with the first antenna 270. For example, the second switch 242 may include a double pole double throw (DPDT) type switch. However, the disclosure is not limited thereto.

According to various embodiments, the diplexer 250 may, for example, separate signals of a first sub-band (e.g., 2.4 to 2.5 GHz) and a second sub-band (e.g., 5.15 to 7.25 GHz) among the first frequency band supported by the first antenna 270. For example, the first switch 240 may connect a transmission/reception path of the second sub-band, which is separated based on the diplexer 250, to the first communication circuit 220 or the second communication circuit 230 (or the second switch 242).

According to various embodiments, the filter 260 may, for example, filter a signal corresponding to the second frequency band in a signal received through the second antenna 271.

Referring to FIG. 2B, an electronic device 201 may include a processor (e.g., including processing circuitry) 210, a first communication circuit 220, a second communication circuit 230, a plurality of switches 240, 242, 244, 246 (which may be referred to hereinafter as switches 240 to 246 for convenience), a plurality of diplexers 250 and 252, a plurality of filters 260 and 262, and/or a plurality of antennas 270, 271, 272, 273 (which may be referred to hereinafter as antennas 270 to 273 for convenience).

According to various embodiments, the electronic device 201 of FIG. 2B may operate similarly to the electronic device 201 of FIG. 2A, except for the difference in that components related to the third antenna 272 configured to support a first frequency band and the fourth antenna 273 configured to support a second frequency band are further included. Accordingly, a detailed description of components overlapping with the components of FIG. 2A in the electronic device 201 of FIG. 2B may not be repeated here.

According to various embodiments, the first communication circuit 220 may transmit and/or receive data to and/or from an external electronic device (e.g., the electronic device 102 of FIG. 1), through at least one of the first antenna 270 or the third antenna 272 configured to support the first frequency band.

According to various embodiments, the first communication circuit 220 may determine a communication circuit for using at least one of the first antenna 270 or the third antenna 272. According to an embodiment, when the first communication circuit 220 has received information related to a service priority of the second communication circuit 230 from the second communication circuit 230, the first communication circuit 220 may select the first communication circuit 220 or the second communication circuit 230 as a communication circuit for using at least one of the first antenna 270 or the third antenna 272, based on the service priority of the second communication circuit 230. For example, when the first communication circuit 220 does not provide a first communication service (e.g., a Wi-Fi communication service), the first communication circuit 220 may determine that the second communication circuit 230 uses at least one of the first antenna 270 or the third antenna 272. For example, the first communication circuit 220 may determine that a communication circuit having a relatively high service priority uses at least one of the first antenna 270 or the third antenna 272. For example, when service priorities of the first communication circuit 220 and the second communication circuit 230 are the same, the first communication circuit 220 may determine that the first communication circuit 220 and the second communication circuit 230 alternately use at least one of the first antenna 270 or the third antenna 272.

According to various embodiments, when the second communication circuit 230 uses channel 8 or channel 9 (e.g., 7.25 to 8.25 GHz), the second communication circuit 230 may transmit and/or receive data to and/or from an external electronic device (e.g., the electronic device 102 of FIG. 1) through at least one of the second antenna 271 or the fourth antenna 273 configured to support the second frequency band. For example, the second communication circuit 230 may transmit or receive data through the second antenna 271. For example, the second communication circuit 230 may receive data through the fourth antenna 273. According to an embodiment, when the second communication circuit 230 uses channel 5 or channel 6 (e.g., 6.25 to 7.25 GHz), the second communication circuit 230 may transmit and/or receive data to and/or from an external electronic device (e.g., the electronic device 102 of FIG. 1) through at least one of the first antenna 270 or the third antenna 272 configured to support the first frequency band (e.g., 2.4 to 2.5 GHz or 5.15 to 7.25 GHz). For example, the second communication circuit 230 may transmit or receive data through the first antenna 270. For example, the second communication circuit 230 may receive data through the third antenna 272.

According to various embodiments, the second communication circuit 230 may control the plurality of switches 240 to 246 such that at least one of the first antenna 270 or the third antenna 272 is connected to the first communication circuit 220 or the second communication circuit 230. According to an embodiment, when the second communication circuit 230 uses channel 5 or channel 6 (e.g., 6.25 to 7.25 GHz), the second communication circuit 230 may transmit the information related to the service priority of the second communication circuit 230 to the first communication circuit 220. According to an embodiment, when the first communication circuit 220 determines that at least one of the first antenna 270 or the third antenna 272 is connected to the first communication circuit 220, the second communication circuit 230 may control the first switch 240 and/or the third switch 244 such that at least one of the first antenna 270 or the third antenna 272 is connected to the first communication circuit 220. For example, the second communication circuit 230 may control the third switch 244 such that the third antenna 272 is connected to the first communication circuit 220. According to an embodiment, when the first communication circuit 220 determines that at least one of the first antenna 270 or the third antenna 272 is connected to the second communication circuit 230, the second communication circuit 230 may control the plurality of switches 240 to 246 such that at least one of the first antenna 270 or the third antenna 272 is connected to the second communication circuit 230. For example, the second communication circuit 230 may control the third switch 244 and the fourth switch 246 such that the third antenna 272 is connected to the second communication circuit 230.

According to various embodiments, the fourth switch 246 may be configured to connect a reception path of the second communication circuit 230 with the third antenna 272 (or the third switch 244) or the fourth antenna 273, based on a control of the second communication circuit 230. According to an embodiment, when the second communication circuit 230 uses channel 8 or channel 9 (e.g., 7.25 to 8.25 GHz), the fourth switch 246 may connect the reception path of the second communication circuit 230 with the fourth antenna 273. According to an embodiment, when the second communication circuit 230 uses channel 5 or channel 6 (e.g., 6.25 to 7.25 GHz), the fourth switch 246 may connect a transmission/reception path of the second communication circuit 230 with the third antenna 272 (or the third switch 244) through the third switch 244. For example, the first switch 240, the third switch 244, and the fourth switch 246 may include a single pole double throw (SPDT) type switch. However, the disclosure is not limited thereto.

According to various embodiments, the second diplexer 252 may separate signals of a first sub-band (e.g., 2.4 to 2.5 GHz) and a second sub-band (e.g., 5.15 to 7.25 GHz) among the first frequency band supported by the third antenna 272. For example, the third switch 244 may connect a transmission/reception path of the second sub-band, which is separated based on the second diplexer 252, to the first communication circuit 220 or the second communication circuit 230 (or the fourth switch 246).

According to various embodiments, the second filter 262 may filter a signal corresponding to the second frequency band in a signal received through the fourth antenna 273.

Referring to FIG. 2C, an electronic device 201 may include a processor (e.g., including processing circuitry) 210, a first communication circuit 220, a second communication circuit 230, a plurality of switches 240, 242, 244, 246 (which may be referred to hereinafter as switches 240 to 246 for convenience), a diplexer 250, a plurality of filters 260, 262, 280, and 282, and/or a plurality of antennas 270, 271, and 273, 274, 275 (which may be referred to hereinafter as antennas 273 to 275 for convenience).

According to various embodiments, the electronic device 201 of FIG. 2C may operate similarly to the electronic device 201 of FIG. 2A and/or FIG. 2B, except for the difference in that the third antenna 272 of FIG. 2B configured to support a first frequency band is divided into the fifth antenna 274 configured to support a first sub-band (e.g., 2.4 to 2.5 GHz) of the first frequency band and the sixth antenna 275 configured to support a second sub-band (e.g., 5.15 to 7.25 GHz) in FIG. 2C. Accordingly, a detailed description of components overlapping with the components of FIG. 2A and/or FIG. 2B in the electronic device 201 of FIG. 2C may not be repeated here.

According to various embodiments, the first communication circuit 220 may transmit and/or receive data to and/or from an external electronic device (e.g., the electronic device 102 of FIG. 1), through at least one of the first antenna 270 configured to support the first frequency band, the fifth antenna 274 configured to support the first sub-band (e.g., 2.4 to 2.5 GHz) of the first frequency band, or the sixth antenna 275 configured to support the second sub-band (e.g., 5.15-7.25 GHz). According to an embodiment, when the first communication circuit 220 uses the first sub-band of the first frequency band, the first communication circuit 220 may transmit and/or receive data to and/or from an external electronic device through at least one of the first antenna 270 or the fifth antenna 274. According to an embodiment, when the first communication circuit 220 uses the second sub-band of the first frequency band, the first communication circuit 220 may transmit and/or receive data to and/or from an external electronic device through at least one of the first antenna 270 or the sixth antenna 275.

According to various embodiments, the third switch 244 may connect the sixth antenna 275 with the first communication circuit 220 or the second communication circuit 230 (or the fourth switch 246). According to an embodiment, when it is determined that the sixth antenna 275 is connected to the first communication circuit 220, the third switch 244 may connect the first communication circuit 220 with the sixth antenna 275, based on a control of the second communication circuit 230. According to an embodiment, when it is determined that the sixth antenna 275 is connected to the second communication circuit 230, the third switch 244 may connect the second communication circuit 230 (or the fourth switch 246) with the sixth antenna 275, based on a control of the second communication circuit 230.

According to various embodiments, the third filter 280 may filter a signal corresponding to the first sub-band in a signal received through the fifth antenna 274. The fourth filter 282 may filter a signal corresponding to the second sub-band in a signal received through the sixth antenna 275.

Referring to FIG. 2D, an electronic device 201 may include a processor (e.g., including processing circuitry) 210, a first communication circuit 220, a second communication circuit 230, a plurality of switches 240, 242, 244, 246 (which may be referred to hereinafter as switches 240 to 246 for convenience), a plurality of filters 260, 262, and 280, 282, 284, 286 (which may be referred to hereinafter as filters 280 to 286 for convenience), and/or a plurality of antennas 271, and 273 to 277.

According to various embodiments, the electronic device 201 of FIG. 2D may operate similarly to the electronic device 201 of FIG. 2C, except for the difference in that the first antenna 270 of FIG. 2C configured to support a first frequency band is divided into antennas 276 and 277 configured to support a first sub-band (e.g., 2.4 to 2.5 GHz) and a second sub-band (e.g., 5.15 to 7.25 GHz) of the first frequency band in FIG. 2D. Accordingly, a detailed description of components overlapping with the components of FIG. 2C in the electronic device 201 of FIG. 2D may not be repeated here.

According to various embodiments, the fifth antenna 274 and/or the seventh antenna 276 may support the first sub-band (e.g., 2.4 to 2.5 GHz) of the first frequency band. The sixth antenna 275 and/or the eighth antenna 277 may support the second sub-band (e.g., 5.15 to 7.25 GHz). According to an embodiment, the first communication circuit 220 may transmit and/or receive data to and/or from an external electronic device (e.g., the electronic device 102 of FIG. 1) through at least one of the fifth antenna 274, the sixth antenna 275, the seventh antenna 276, or the eighth antenna 277. For example, when the first communication circuit 220 uses the first sub-band of the first frequency band, the first communication circuit 220 may transmit and/or receive data to and/or from an external electronic device through at least one of the fifth antenna 274 or the seventh antenna 276. For example, when the first communication circuit 220 uses the second sub-band of the first frequency band, the first communication circuit 220 may transmit and/or receive data to and/or from an external electronic device through at least one of the sixth antenna 275 or the eighth antenna 277.

According to various embodiments, the first switch 240 may connect the eighth antenna 277 with the first communication circuit 220 or the second communication circuit 230 (or the second switch 242). According to an embodiment, when it is determined that the eighth antenna 277 is connected to the first communication circuit 220, the first switch 240 may connect the first communication circuit 220 with the eighth antenna 277, based on a control of the second communication circuit 230. According to an embodiment, when it is determined that the eighth antenna 277 is connected to the second communication circuit 230, the first switch 240 may connect the second communication circuit 230 (or the second switch 242) with the eighth antenna 277, based on a control of the second communication circuit 230.

According to various embodiments, the fifth filter 284 may filter a signal corresponding to the first sub-band in a signal received through the seventh antenna 276. The sixth filter 286 may filter a signal corresponding to the second sub-band in a signal received through the eighth antenna 277.

Referring to FIG. 2E, an electronic device 201 may include a processor (e.g., including processing circuitry) 210, a first communication circuit 220, a second communication circuit 230, a plurality of switches 240, 242, 244, 246 (which may be referred to hereinafter as switches 240 to 246 for convenience), a plurality of diplexers 250 and 252, a plurality of filters 260 and 262, and/or a plurality of antennas 270, 271, 272, 273 (which may be referred to hereinafter as antennas 270 to 273 for convenience).

According to various embodiments, the electronic device 201 of FIG. 2E may operate similarly to the electronic device 201 of FIG. 2B, except for the difference in that the first communication circuit 220 and the second communication circuit 230 are not connected to each other. Accordingly, a detailed description of components overlapping with the components of FIG. 2B in the electronic device 201 of FIG. 2E may not be repeated here.

According to various embodiments, the processor 210 may control a connection of at least one of the first antenna 270 or the third antenna 272 and the first communication circuit 220 or the second communication circuit 230. According to an embodiment, when the occurrence of an event (e.g., an active event) related to the second communication circuit 230 is detected, the processor 210 may identify whether the first communication circuit 220 is active. When the first communication circuit 220 is in an inactive state, the processor 210 may determine that the second communication circuit 230 uses at least one of the first antenna 270 or the third antenna 272. For example, the processor 210 may determine whether an event (e.g., an active event) related to the second communication circuit 230 occurs, through Bluetooth or Bluetooth low energy (BLE).

According to an embodiment, the processor 210 may determine a communication circuit (e.g., a Wi-Fi communication circuit 220 or a UWB communication circuit 230) to use at least one of the first antenna 270 or the third antenna 272, based on service priorities of the first communication circuit 220 and the second communication circuit 230. For example, the processor 210 may determine that a communication circuit (e.g., the Wi-Fi communication circuit 220 or the UWB communication circuit 230) having a relatively high service priority uses at least one of the first antenna 270 or the third antenna 272. For example, when the service priorities of the first communication circuit 220 and the second communication circuit 230 are the same, the processor 210 may determine that the first communication circuit 220 and the second communication circuit 230 alternately use at least one of the first antenna 270 or the third antenna 272.

According to various embodiments, the processor 210 may control the plurality of switches 240 to 246 such that at least one of the first communication circuit 220 or the second communication circuit 230 is connected to at least one of the first antenna 270 or the third antenna 272. According to an embodiment, when it is determined that the second communication circuit 230 uses at least one of the first antenna 270 or the third antenna 272, the processor 210 may control the first switch 240 to the fourth switch 246 such that at least one of the first antenna 270 or the third antenna 272 is connected to the second communication circuit 230. According to an embodiment, when it is determined that the first communication circuit 220 uses at least one of the first antenna 270 or the third antenna 272, the processor 210 may control the first switch 240 and/or the third switch 244 such that at least one of the first antenna 270 or the third antenna 272 is connected to the first communication circuit 220. According to an embodiment, when it is determined that the first communication circuit 220 and the second communication circuit 230 alternately use at least one of the first antenna 270 or the third antenna 272, the processor 210 may control the first switch 240 to the fourth switch 246 such that at least one of the first antenna 270 or the third antenna 272 is alternately connected to the first communication circuit 220 or the second communication circuit 230 based on a reference time.

Referring to FIG. 2F, an electronic device 201 may include a processor (e.g., including processing circuitry) 210, a first communication circuit 220, a second communication circuit 230, a plurality of switches 240, 242, 244, 246 (which may be referred to hereinafter as switches 240 to 246 for convenience), a diplexer 250, a plurality of filters 264, 266, 280, and 282, and/or a plurality of antennas 274, 278, 279, 290 and 291.

According to an embodiment, the processor 210 may be substantially the same as or similar to the processor 120 of FIG. 1 or may be included in the processor 120. According to an embodiment, the first communication circuit 220 and the second communication circuit 230 may be substantially the same as or similar to the wireless communication module 192 or may be included in the wireless communication module 192. According to an embodiment, the plurality of antennas 274, 278, 279, 290 and 291 may be substantially the same as or similar to the antenna module 197 or may be included in the antenna module 197. According to an embodiment, the processor 210 of FIG. 2F may operate similarly to the processor 210 of FIG. 2A. Accordingly, a detailed description of the processor 210 overlapping with the processor of FIG. 2A in the electronic device 201 of FIG. 2F may not be repeated here.

According to various embodiments, the second communication circuit 230 may support at least a part (e.g., 6.25 to 8.25 GHz) of a third frequency band (e.g., 5.925 to 8.25 GHz), based on a second communication scheme (e.g., a UWB communication scheme). According to an embodiment, the second communication circuit 230 may transmit and/or receive data to and/or from an external electronic device (e.g., the electronic device 102 of FIG. 1), through at least one of the ninth antenna 278 or the tenth antenna 279 configured to support the third frequency band.

According to various embodiments, the first communication circuit 220 may support at least a part (e.g., 5.925 to 7.25 GHz) of the third frequency band and a fourth frequency band (e.g., 2.4 to 2.5 GHz, and 5.15 to 5.835 GHz), based on a first communication scheme (e.g., a Wi-Fi communication scheme). According to an embodiment, the first communication circuit 220 may transmit and/or receive data to and/or from an external electronic device (e.g., the electronic device 102 of FIG. 1) through at least one of the ninth antenna 278 or the tenth antenna 279 configured to support the third frequency band, the eleventh antenna 290 configured to support the fourth frequency band, the fifth antenna 274 configured to support a first sub-band (e.g., 2.4 to 2.5 GHz) of the fourth frequency band, or the twelfth antenna 291 configured to support a second sub-band (e.g., 5.15 to 5.835 GHz) of the fourth frequency band.

According to various embodiments, the first communication circuit 220 may determine a communication circuit (e.g., the first communication circuit 220 or the second communication circuit 230) for using at least one of the ninth antenna 278 or the tenth antenna 279. According to an embodiment, when the first communication circuit 220 has received information related to a service priority of the second communication circuit 230 from the second communication circuit 230, the first communication circuit 220 may select the first communication circuit 220 or the second communication circuit 230 as a communication circuit for using at least one of the ninth antenna 278 or the tenth antenna 279, based on the service priority of the second communication circuit 230. For example, when the first communication circuit 220 does not provide a service related to the first communication circuit 220, the first communication circuit 220 may determine that the second communication circuit 230 uses at least one of the ninth antenna 278 or the tenth antenna 279. For example, the first communication circuit 220 may determine that a communication circuit having a relatively high service priority, among the first communication circuit 220 and the second communication circuit 230, uses at least one of the ninth antenna 278 or the tenth antenna 279. For example, when service priorities of the first communication circuit 220 and the second communication circuit 230 are the same, the first communication circuit 220 may determine that the first communication circuit 220 and the second communication circuit 230 alternately use at least one of the ninth antenna 278 or the tenth antenna 279. For example, the first communication circuit 220 may be connected to the second communication circuit 230 through a UART interface.

According to various embodiments, the second communication circuit 230 may control the plurality of switches 240 to 246 such that at least one of the ninth antenna 278 or the tenth antenna 279 is connected to the first communication circuit 220 or the second communication circuit 230. According to an embodiment, when it is determined that the second communication circuit 230 uses at least one of the ninth antenna 278 or the tenth antenna 279, the second communication circuit 230 may control the second switch 242 and the fourth switch 246 such that at least one of the ninth antenna 278 or the tenth antenna 279 is connected to the second communication circuit 230. According to an embodiment, when it is determined that the first communication circuit 220 uses at least one of the ninth antenna 278 or the tenth antenna 279, the second communication circuit 230 may control the first switch 240 to the fourth switch 246 such that at least one of the ninth antenna 278 or the tenth antenna 279 is connected to the first communication circuit 220. According to an embodiment, when it is determined that the first communication circuit 220 and the second communication circuit 230 alternately use at least one of the ninth antenna 278 or the tenth antenna 279, the second communication circuit 230 may control the first switch 240 to the fourth switch 246 such that at least one of the ninth antenna 278 or the tenth antenna 279 is alternately connected to the first communication circuit 220 or the second communication circuit 230 based on a reference time.

According to various embodiments, the first switch 240 may connect the first communication circuit 220 to the eleventh antenna 290 or the ninth antenna 278 (or the second switch 242), based on a control of the second communication circuit 230. For example, the first switch 240 may include an SPDT type switch. However, the disclosure is not limited thereto.

According to various embodiments, the third switch 244 may connect the first communication circuit 220 to the twelfth antenna 291 or the tenth antenna 279 (or the fourth switch 246), based on a control of the second communication circuit 230. For example, the third switch 244 may include an SPDT type switch. However, the disclosure is not limited thereto.

According to various embodiments, the second switch 242 may connect the ninth antenna 278 to the first communication circuit 220 (or the first switch 240) or the second communication circuit 230, based on a control of the second communication circuit 230. For example, the second switch 242 may include a single pole quad throw (SP4T) type switch. However, the disclosure is not limited thereto.

According to various embodiments, the fourth switch 246 may connect the tenth antenna 279 to the first communication circuit 220 (or the third switch 244) or the second communication circuit 230, based on a control of the second communication circuit 230. For example, the fourth switch 246 may include an SPDT type switch. However, the disclosure is not limited thereto.

According to various embodiments, the seventh filter 264 may filter a signal corresponding to the third frequency band in a signal received through the ninth antenna 278. The eighth filter 266 may filter a signal corresponding to the third frequency band in a signal received through the tenth antenna 279.

According to various embodiments, the electronic device 201 may determine a communication circuit for using the first antenna 270 using the second communication circuit 230. According to an embodiment, the second communication circuit 230 may select the first communication circuit 220 or the second communication circuit 230 as a communication circuit for using the first antenna 270, based on information related to a service priority of the first communication circuit 220 provided from the first communication circuit 220 (or the processor 210). For example, the information related to the service priority of the first communication circuit 220 may be transmitted to the second communication circuit 230 by the first communication circuit 220, based on detection of occurrence of an event (e.g., an active event) related to the second communication circuit 230 in the processor 210. For example, when the first communication circuit 220 has received information related to the occurrence of the event from the processor 210, the first communication circuit 220 may transmit the information related to the service priority of the first communication circuit 220 to the second communication circuit 230. For example, when the first communication circuit 220 has received the information related to the occurrence of the event from the processor 210, the first communication circuit 220 may transmit the information related to the service priority of the first communication circuit 220 to the second communication circuit 230 through the processor 210.

According to various example embodiments, an electronic device (e.g., the electronic device 101 of FIG. 1 or the electronic device 201 of FIGS. 2A to 2F) may include: a first communication circuit (e.g., the wireless communication module 192 of FIG. 1 or the first communication circuit 220 of FIGS. 2A to 2F) configured to support a first frequency band; a second communication circuit (e.g., the wireless communication module 192 of FIG. 1 or the second communication circuit 230 of FIGS. 2A to 2F) configured to support at least a part of the first frequency band and a second frequency band; a first switch (e.g., the first switch 240 of FIGS. 2A to 2F) connected to the first communication circuit; a second switch (e.g., the second switch 242 of FIGS. 2A to 2F) connected to the second communication circuit and the first switch; a first antenna (e.g., the first antenna 270 of FIGS. 2A to 2C) connected to the first switch and configured to support the first frequency band; and a second antenna (e.g., the second antenna 271 of FIGS. 2A to 2C) connected to the second switch and configured to support the second frequency band, wherein based on the second communication circuit using the first frequency band, the second communication circuit is configured to control the first switch and the second switch to selectively connect the first antenna to one of the first communication circuit or the second communication circuit.

According to various example embodiments, the second communication circuit may be operatively connected to the first communication circuit, and based on the second communication circuit using the first frequency band, the second communication circuit may be configured to: provide information related to a service priority of the second communication circuit to the first communication circuit, and control the first switch and the second switch to selectively connect the first antenna to one of the first communication circuit or the second communication circuit, based on a control signal provided from the first communication circuit.

According to various example embodiments, based on a service priority of the first communication circuit being relatively higher than a service priority of the second communication circuit, the first communication circuit may be configured to transmit, to the second communication circuit, a control signal for a connection of the first antenna and the first communication circuit, based on the service priority of the second communication circuit being relatively higher than the service priority of the first communication circuit, the first communication circuit may be configured to transmit, to the second communication circuit, a control signal for a connection of the first antenna and the second communication circuit, and based on the service priorities of the first communication circuit and the second communication circuit being the same, the first communication circuit may be configured to transmit, to the second communication circuit, a control signal for alternately connecting the first antenna to the first communication circuit and the second communication circuit.

According to various example embodiments, based on the first communication circuit not providing a service, the first communication circuit may be configured to transmit, to the second communication circuit, a control signal for a connection of the first antenna and the second communication circuit.

According to various example embodiments, based on the first antenna and the first communication circuit being connected to each other based on the control signal, the second communication circuit may be configured to provide information related to a service priority of the second communication circuit to the first communication circuit, and based on the number of transmissions of the information related to the service priority of the second communication circuit satisfying a specified condition, the second communication circuit may be configured to: update the service priority of the second communication circuit, and provide information related to the updated service priority of the second communication circuit to the first communication circuit.

According to various example embodiments, based on the second communication circuit using the second frequency band, the second communication circuit may be configured to control the second switch to connect the second antenna with the second communication circuit.

According to various example embodiments, the first communication circuit may be configured to support a wireless fidelity (Wi-Fi) communication scheme, and the second communication circuit may be configured to support an ultra-wideband (UWB) communication scheme.

According to various example embodiments, the first antenna may be configured to support a band of 2.4 GHz to 7.25 GHz, and the second antenna may be configured to support a band of 7.25 GHz to 8.5 GHz.

According to various example embodiments, the second communication circuit may be configured to support a band of 6.25 GHz to 7.25 GHz which is at least a part of the first frequency band, and a band of 7.25 GHz to 8.25 GHz which is the second frequency band.

According to various example embodiments, an electronic device (e.g., the electronic device 101 of FIG. 1 or the electronic device 201 of FIGS. 2A to 2F) may include: a first communication circuit (e.g., the wireless communication module 192 of FIG. 1 or the first communication circuit 220 of FIGS. 2A to 2F) configured to support a first frequency band; a second communication circuit (e.g., the wireless communication module 192 of FIG. 1 or the second communication circuit 230 of FIGS. 2A to 2F) configured to support at least a part of the first frequency band and a second frequency band; a first switch (e.g., the first switch 240 of FIGS. 2A to 2F) connected to the first communication circuit; a second switch (e.g., the second switch 242 of FIGS. 2A to 2F) connected to the second communication circuit and the first switch; a first antenna (e.g., the first antenna 270 of FIGS. 2A to 2C) connected to the first switch and configured to support the first frequency band; a second antenna (e.g., the second antenna 271 of FIGS. 2A to 2C) connected to the second switch and configured to support the second frequency band; and a processor (e.g., the processor 120 of FIG. 1 or the processor 210 of FIGS. 2A to 2F) operatively connected to the first communication circuit and the second communication circuit, wherein based on the second communication circuit using the first frequency band, at least one of the first communication circuit, the second communication circuit, and the processor are configured to control the first switch and the second switch to selectively connect the first antenna to one of the first communication circuit or the second communication circuit.

According to various example embodiments, based on the second communication circuit using the first frequency band, the processor may be configured to control the first switch and the second switch to selectively connect the first antenna to one of the first communication circuit or the second communication circuit, based on service priorities of the first communication circuit and the second communication circuit.

Figure 3:
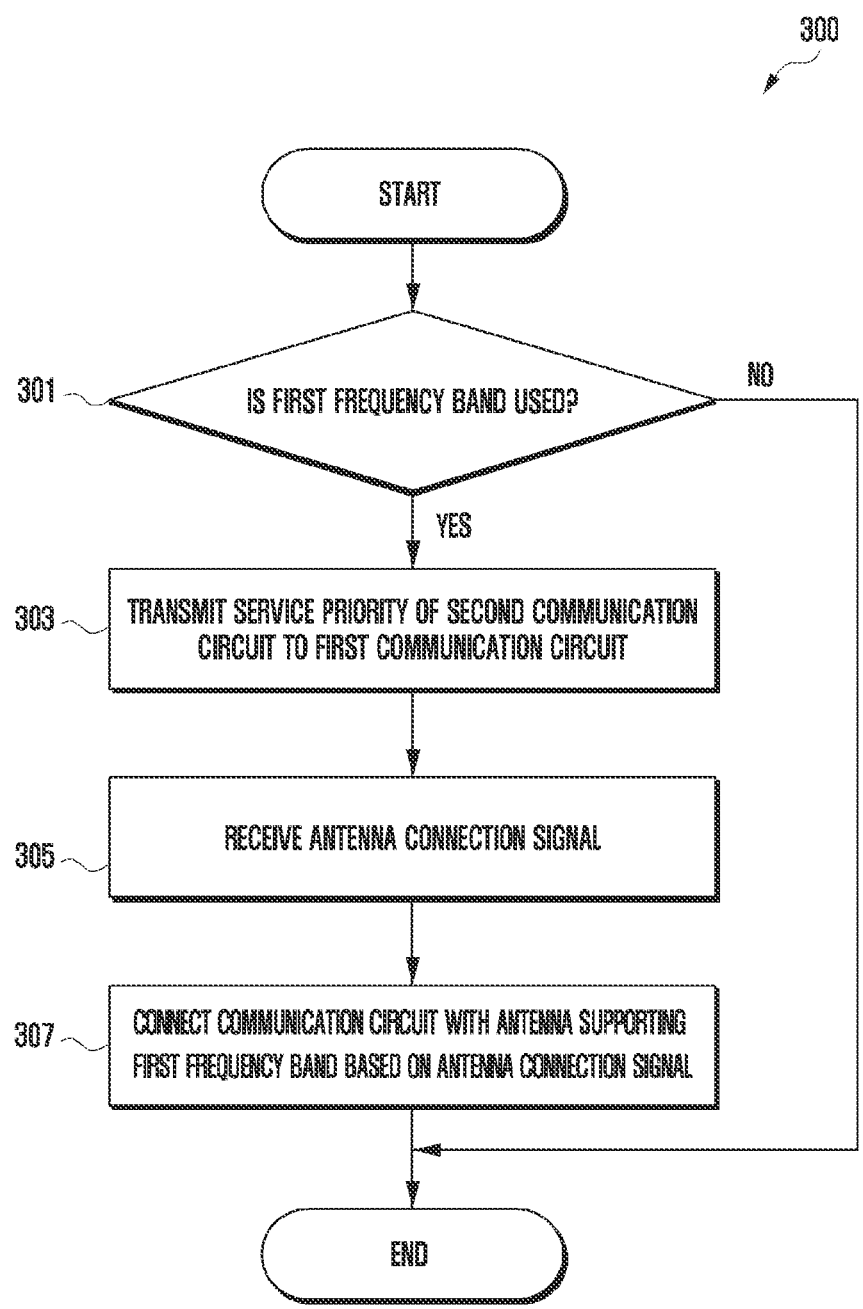
FIG. 3 is a flowchart illustrating an example operation for controlling a connection with an antenna by a second communication circuit according to various embodiments.

FIG. 3 is a flowchart 300 illustrating an example operation for controlling a connection with an antenna by a second communication circuit according to various embodiments. In the following embodiments, each operation may be performed sequentially, but is not necessarily performed sequentially. For example, an order of each operation may be changed, and at least two operations may be performed in parallel. For example, an electronic device may be the electronic device 101 of FIG. 1 or the electronic device 201 of FIGS. 2A, 2B, 2C, 2D, 2E and 2F (which may be referred to hereinafter as FIGS. 2A to 2F for convenience).

Referring to FIG. 3, according to various embodiments, in operation 301, a second communication circuit (e.g., the wireless communication module 192 of FIG. 1 or the second communication circuit 230 of FIGS. 2A to 2F) of the electronic device may determine whether to provide a second communication service (e.g., a UWB service) using a first frequency band. According to an embodiment, the second communication circuit 230 may identify a frequency band to be used to provide the second communication service (e.g., the UWB service), based on information related to an event received from a processor 210. For example, the information related to the event may include at least one of information (e.g., a used frequency band and a service type) related to a service provided through the second communication circuit 230 or an active signal of the second communication circuit 230. For example, the second communication circuit 230 may maintain an inactive state until the information related to the event is received from the processor 210. For example, the first frequency band may include 2.4 to 2.5 GHz, or 5.15 to 7.25 GHz, a first communication circuit 220 may support at least a part (e.g., 2.4 to 2.5 GHz, or 5.15 to 7.15 GHz) of the first frequency band, and the second communication circuit 230 may support at least another part (e.g., 6.25 to 7.25 GHz) of the first frequency band.

According to various embodiments, when the first frequency band is not being used for the second communication service (e.g., the UWB service) (e.g., "No" in operation 301), the second communication circuit (e.g., the wireless communication module 192 or the second communication circuit 230) of the electronic device may determine that a second frequency band (e.g., 7.25 to 8.25 GHz) is being used for the second communication service (e.g., the UWB service). According to an embodiment, when the second communication circuit 230 uses the second frequency band (e.g., 7.25 to 8.25 GHz) for the second communication service (e.g., the UWB service), the second communication circuit 230 may transmit and/or receive, to and/or from an external electronic device (e.g., the electronic device 102 of FIG. 1), data related to the second communication service (e.g., the UWB service) through the second antenna 271 of FIG. 2A, which is configured to support the second frequency band.

According to various embodiments, when the second communication circuit (e.g., the wireless communication module 192 or the second communication circuit 230) of the electronic device provides the second communication service (e.g., the UWB service) using the first frequency band (e.g., "Yes" in operation 301), in operation 303, the second communication circuit may transmit information related to a service priority of the second communication circuit (e.g., the second communication circuit 230) to the first communication circuit (e.g., the wireless communication module 192 or the first communication circuit 220) of the electronic device. According to an embodiment, the second communication circuit 230 may transmit information related to a priority of a service provided by the second communication circuit 230 to the first communication circuit 220 through a UART interface.

According to various embodiments, in operation 305, the second communication circuit (e.g., the wireless communication module 192 or the second communication circuit 230) of the electronic device may receive an antenna connection signal from the first communication circuit (e.g., the first communication circuit 220). According to an embodiment, the second communication circuit 230 may receive an antenna connection signal from the first communication circuit 220 through the UART interface. For example, the antenna connection signal may include connection information between the first antenna 270 of FIG. 2A configured to support the first frequency band, and the first communication circuit 220 or the second communication circuit 230.

According to various embodiments, in operation 307, the second communication circuit (e.g., the wireless communication module 192 or the second communication circuit 230) of the electronic device may connect an antenna (e.g., the first antenna 270 of FIG. 2A) configured to support the first frequency band with the first communication circuit (e.g., the first communication circuit 220) or the second communication circuit (e.g., the second communication circuit 230), based on the antenna connection signal provided from the first communication circuit (e.g., the first communication circuit 220). According to an embodiment, the second communication circuit 230 may control a plurality of switches 240 to 246 such that the first antenna 270 of FIG. 2A configured to support the first frequency band is connected to the second communication circuit 230 or the first communication circuit 220, based on the antenna connection signal provided from the first communication circuit 220.

Figure 4:
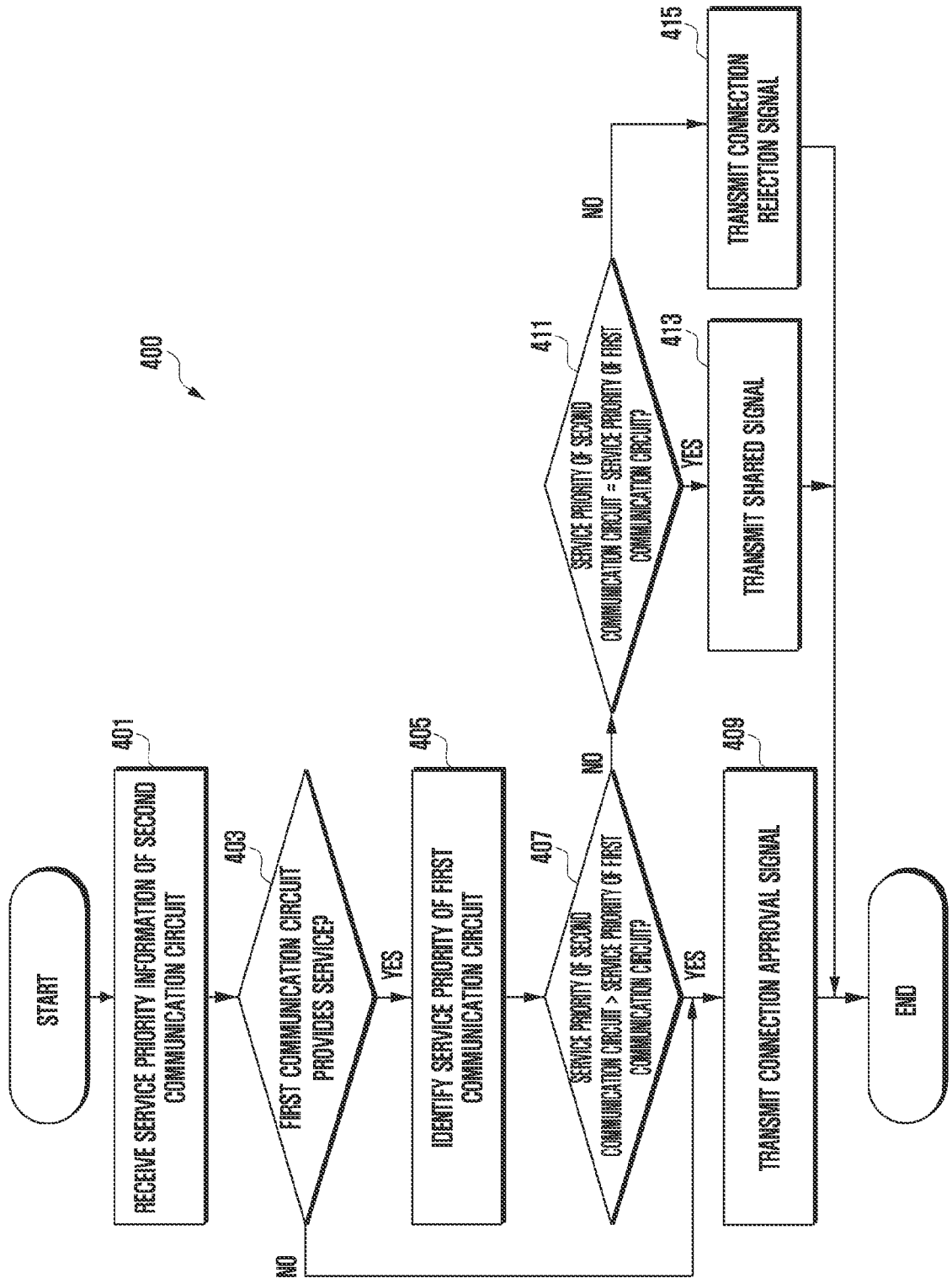
FIG. 4 is a flowchart illustrating an example operation for selecting, by a first communication circuit, a communication circuit for connecting to an antenna according to various embodiments.

FIG. 4 is a flowchart 400 illustrating an example operation for selecting, by a first communication circuit, a communication circuit for connecting to an antenna according to various embodiments. In the following embodiments, each operation may be performed sequentially, but is not necessarily performed sequentially. For example, an order of each operation may be changed, and at least two operations may be performed in parallel. For example, an electronic device may be the electronic device 101 of FIG. 1 or the electronic device 201 of FIGS. 2A to 2F.

Referring to FIG. 4, according to various embodiments, in operation 401, a first communication circuit (e.g., the wireless communication module 192 of FIG. 1 or the first communication circuit 220 of FIGS. 2A to 2F) of the electronic device may receive information related to a service priority from a second communication circuit (e.g., the wireless communication module 192 or the second communication circuit 230) of the electronic device. According to various embodiments, when the first communication circuit 220 has received the information related to the service priority from the second communication circuit 230 through a UART interface, the first communication circuit 220 may determine that the second communication circuit 230 requests the use of an antenna configured to support a first frequency band.

According to various embodiments, in operation 403, the first communication circuit (e.g., the wireless communication module 192 or the first communication circuit 220) of the electronic device may determine whether a service is being provided through the first communication circuit (e.g., the first communication circuit 220). According to an embodiment, the first communication circuit 220 may determine whether a service using a first communication scheme (e.g., a Wi-Fi communication scheme) is being provided.

According to various embodiments, when the service is being provided through the first communication circuit (e.g., the first communication circuit 220) (e.g., "YES" in operation 403), in operation 405, the first communication circuit (e.g., the wireless communication module 192 or the first communication circuit 220) of the electronic device may identify a service priority of the first communication circuit (e.g., the first communication circuit 220). According to an embodiment, the first communication circuit 220 may identify the type of the service using the first communication scheme (e.g., the Wi-Fi communication scheme) provided by the first communication circuit 220. The first communication circuit 220 may identify a service priority corresponding to the type of the service using the first communication scheme (e.g., the Wi-Fi communication scheme) from a priority list stored in a memory (e.g., the memory 130 of FIG. 1).

According to various embodiments, in operation 407, the first communication circuit (e.g., the wireless communication module 192 or the first communication circuit 220) of the electronic device may identify whether a service priority of the second communication circuit (e.g., the second communication circuit 230) is relatively higher than a priority of a service being operated by the first communication circuit (e.g., the first communication circuit 220). According to an embodiment, the service priorities of the first communication circuit 220 and the second communication circuit 230 may be defined by way of non-limiting as shown in Table 1 below.

TABLE 1

| priority | service | UWB | Wi-Fi |
|---|---|---|---|
| P1 | Service in which Passive & Latency are important | Key | |
| P2 | Service in which Passive & Latency are important | | Wi-Fi call |
| P3 | Service that a user can intuitively feel (e.g., a display and an audio) | AR game | Mirroring, Aware |
| P4 | Data or sensor function application | Asset Tracking Indoor Navigation | Data communication |

For example, in Table 1, a service priority of a key service using the second communication circuit 230 may be defined as P1, which is the highest service priority. A service priority of a call service (e.g., W-Fi call) using the first communication circuit 220 may be defined as P2. A service priority of an augmented reality (AR) game application using the second communication circuit 230 and a mirroring or aware service using the first communication circuit 220 may be defined as P3. A service priority of an asset tracking service or an indoor navigation service using the second communication circuit 230, and a data communication service using the first communication circuit 220 may be defined as P4.

According to various embodiments, when the first communication circuit (e.g., the wireless communication circuit 192 or the first communication circuit 220) of the electronic device does not provide a service related to the first communication circuit (e.g., the first communication circuit 220) (e.g., "No" in operation 403), or the service priority of the second communication circuit (e.g., the second communication circuit 230) is relatively higher than the service priority of the first communication circuit (e.g., the first communication circuit 220) (e.g., "YES" in operation 407), in operation 409, the first communication circuit may transmit an approval signal related to a connection of the antenna configured to support the first frequency band to the second communication circuit (e.g., the second communication circuit 230). According to an embodiment, when the first communication circuit 220 does not provide the service using the first communication scheme (e.g., the Wi-Fi communication scheme), the first communication circuit 220 may determine that the second communication circuit 230 uses the first antenna 270 of FIG. 2A configured to support the first frequency band, regardless of the service priority of the second communication circuit 230. According to an embodiment, when the service priority of the second communication circuit 230 is, for example, P1 which may, for example, be the highest priority, the first communication circuit 220 may determine that the second communication circuit 230 uses the first antenna 270 regardless of the service type of the first communication circuit 220. According to an embodiment, when the first communication circuit 220 determines that the second communication circuit 230 uses the antenna (e.g., the first antenna 270 of FIG. 2A) configured to support the first frequency band, the first communication circuit 220 may transmit a connection approval signal to the second communication circuit 230 through the UART interface.

According to various embodiments, when the service priority of the second communication circuit (e.g., the second communication circuit 230) is not relatively higher than the service priority of the first communication circuit (e.g., the first communication circuit 220) (e.g., "NO" in operation 407), in operation 411, the first communication circuit (e.g., the wireless communication circuit 192 or the first communication circuit 220) of the electronic device may identify whether the service priority of the second communication circuit (e.g., the second communication circuit 230) and the service priority of the first communication circuit (e.g., the first communication circuit 220) are the same.

According to various embodiments, when the service priority of the second communication circuit (e.g., the second communication circuit 230) and the service priority of the first communication circuit (e.g., the first communication circuit 220) are the same (e.g., "YES" in operation 411), in operation 413, the first communication circuit (e.g., the wireless communication circuit 192 or the first communication circuit 220) of the electronic device may transmit a shared signal related to a connection of the antenna (e.g., the first antenna 270 of FIG. 2A) configured to support the first frequency band to the second communication circuit (e.g., the second communication circuit 230). According to an embodiment, when the service priorities of the first communication circuit 220 and the second communication circuit 230 are the same, the first communication circuit 220 may determine that the first communication circuit 220 and the second communication circuit 230 share the first antenna 270 of FIG. 2A configured to support the first frequency band. In this case, the first communication circuit 220 may transmit a connection sharing signal to the second communication circuit 230 through the UART interface. For example, the sharing of an antenna may include an operation of alternately using a corresponding antenna by dividing the time during which the first communication circuit 220 and the second communication circuit 230 use the antenna. For another example, when the first communication circuit 220 and the second communication circuit 230 share a plurality of antennas, the sharing of the antennas may include an operation in which the first communication circuit 220 uses at least a part of the plurality of antennas and the second communication circuit 230 uses the remaining part of the antennas.

According to various embodiments, when the service priority of the second communication circuit (e.g., the second communication circuit 230) and the service priority of the first communication circuit (e.g., the first communication circuit 220) are not the same (e.g., "NO" in operation 411), in operation 415, the first communication circuit (e.g., the wireless communication circuit 192 or the first communication circuit 220) of the electronic device may transmit a connection rejection signal related to a connection of the antenna (e.g., the first antenna 270 of FIG. 2A) configured to support the first frequency band to the second communication circuit (e.g., the second communication circuit 230). According to an embodiment, in operation 411, when the service priority of the second communication circuit 230 and the service priority of the first communication circuit 220 are not the same, the first communication circuit 220 may determine that the service priority of the first communication circuit 220 is relatively higher than the service priority of the second communication circuit 230. For example, the first communication circuit 220 may determine that the service using the first communication scheme (e.g., the Wi-Fi communication scheme) is preferentially provided. Accordingly, the first communication circuit 220 may transmit a rejection signal corresponding to a use request of the antenna configured to support the first frequency band to the second communication circuit 230 through the UART interface.

Figure 5:
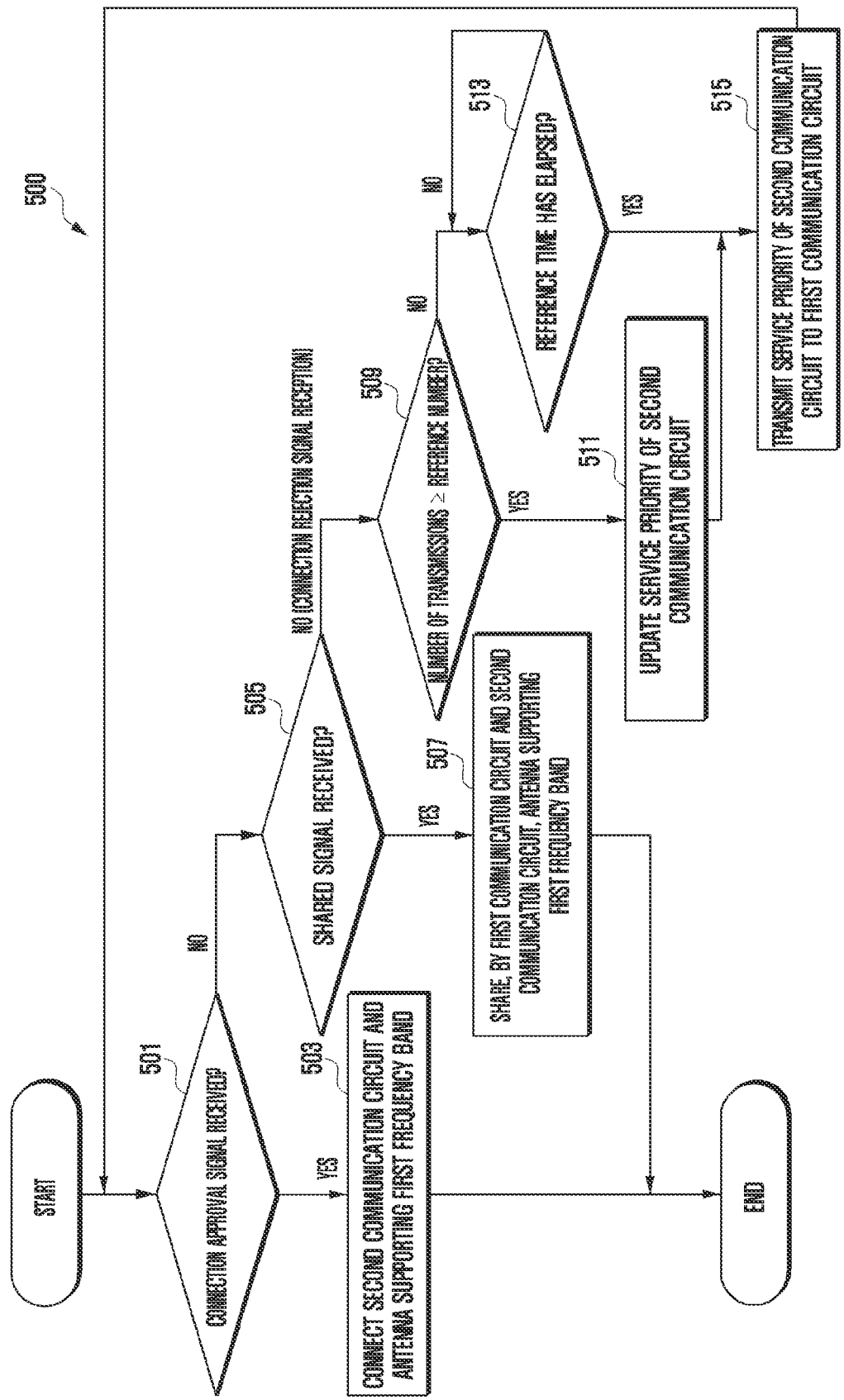
FIG. 5 is a flowchart illustrating an example operation for controlling a connection with an antenna by a second communication circuit, based on a control of a first communication circuit, according to various embodiments.

FIG. 5 is a flowchart 500 illustrating an example operation for controlling a connection with an antenna by a second communication circuit, based on a control of a first communication circuit, according to various embodiments.

Figure 6:
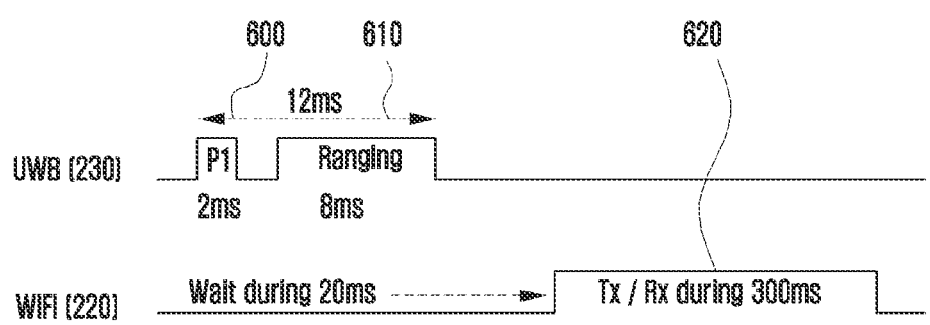
FIG. 6 is a diagram illustrating an example connection with an antenna in a state in which a service priority of a second communication circuit is relatively high, according to various embodiments.
Figure 7:
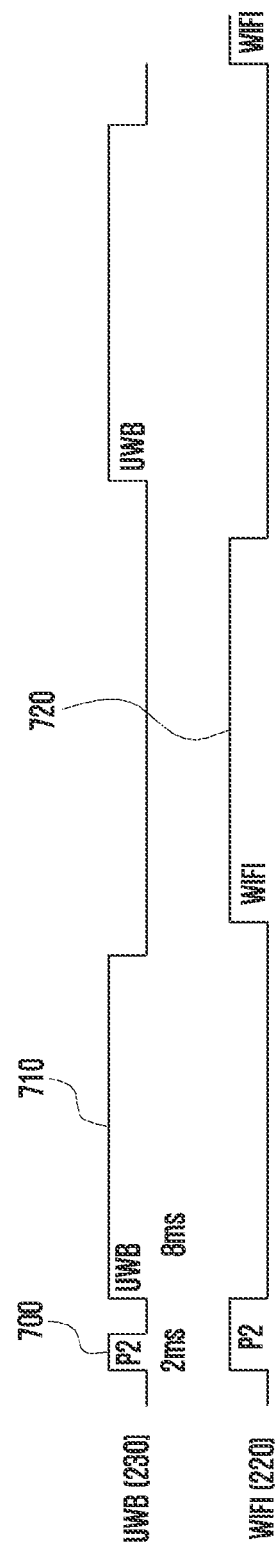
FIG. 7 is a diagram illustrating an example connection with an antenna in a state in which service priorities of a first communication circuit and a second communication circuit are the same, according to various embodiments.
Figure 8:
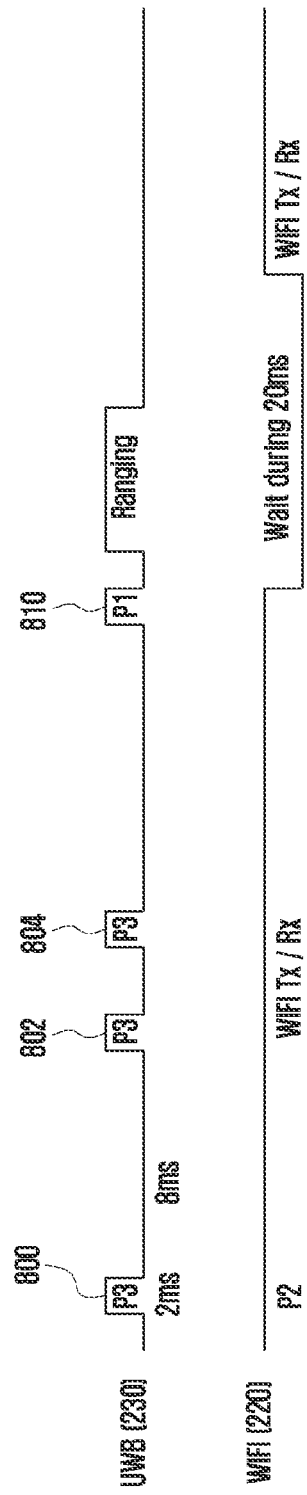
FIG. 8 is a diagram illustrating an example connection with an antenna in a state in which a service priority of a first communication circuit is relatively high, according to various embodiments.

The operations of FIG. 5 described below may include, for example, detailed operations of operation 307 of FIG. 3. In the following embodiments, each operation may be performed sequentially, but is not necessarily performed sequentially. For example, an order of each operation may be changed, and at least two operations may be performed in parallel. For example, an electronic device may be the electronic device 101 of FIG. 1 or the electronic device 201 of FIGS. 2A to 2F. In the following description, at least some operations of FIG. 5 may be described with reference to FIGS. 6, 7, and 8. FIG. 6 is a diagram illustrating an example connection with an antenna in a state in which a service priority of a second communication circuit is relatively high, according to various embodiments. FIG. 7 is a diagram illustrating an example connection with an antenna in a state in which service priorities of a first communication circuit and a second communication circuit are the same, according to various embodiments. FIG. 8 is a diagram illustrating an example connection with an antenna in a state in which a service priority of a first communication circuit is relatively high, according to various embodiments.

Referring to FIG. 5, according to various embodiments, in operation 501, a second communication circuit (e.g., the wireless communication module 192 of FIG. 1 or the second communication circuit 230 of FIGS. 2A to 2F) of the electronic device may identify whether a connection approval signal has been received from a first communication circuit (e.g., the wireless communication module 192 or the first communication circuit 220) of the electronic device. For example, the connection approval signal may include information which instructs the second communication circuit (e.g., the second communication circuit 230) to use an antenna (e.g., the first antenna 270 of FIG. 2A) configured to support a first frequency band.

According to various embodiments, when the second communication circuit (e.g., the wireless communication circuit 192 or the second communication circuit 230) of the electronic device has received a connection approval signal from the first communication circuit (e.g., the first communication circuit 220) of the electronic device (e.g., "YES" in operation 501), in operation 503, the second communication circuit may connect the antenna (e.g., the first antenna 270 of FIG. 2A) configured to support the first frequency band with the second communication circuit (e.g., the second communication circuit 230). According to an embodiment, as shown in FIG. 6, when a service priority of P1 is provided to the first communication circuit 220 (operation 600), the second communication circuit 230 may receive a connection approval signal from the first communication circuit 220. Based on the connection approval signal, the second communication circuit 230 may determine that the second communication circuit 230 can use at least one of the first antenna 270 or the third antenna 272 of FIG. 2B, which is configured to support the first frequency band. In this case, the second communication circuit 230 may control a plurality of switches 240 to 246 such that at least one of the first antenna 270 or the third antenna 272 is connected to the second communication circuit 230. For example, the second communication circuit 230 may control connections of the plurality of switches 240 to 246 using a general purpose input/output (GPIO). When the second communication circuit 230 is connected to at least one of the first antenna 270 or the third antenna 272, as shown in FIG. 6, the second communication circuit 230 may provide a service (e.g., ranging) using a second communication scheme (e.g., a UWB communication scheme) (operation 610). According to an embodiment, when the first communication circuit 220 does not operate at the time point when the second communication circuit 230 requests the use of an antenna, the second communication circuit 230 may control the plurality of switches 240 to 246 to maintain a connection between at least one of the first antenna 270 or the third antenna 272 and the second communication circuit 230 while the service using the second communication scheme (e.g., the UWB communication scheme) is maintained. According to an embodiment, when the first communication circuit 220 is in operation at the time point when the second communication circuit 230 requests the use of an antenna, as shown in FIG. 6, the second communication circuit 230 may control the plurality of switches 240 to 246 such that the first communication circuit 220 uses at least one of the first antenna 270 or the third antenna 272 during the time when the antenna is not used by the second communication circuit 230 (operation 620). When a time point of the antenna use of the second communication circuit 230 arrives, the second communication circuit 230 may control the plurality of switches 240 to 246 such that at least one of the first antenna 270 or the third antenna 272 is reconnected to the second communication circuit 230.

According to various embodiments, when the second communication circuit (e.g., the wireless communication module 192 or the second communication circuit 230) of the electronic device has not received a connection approval signal from the first communication circuit (e.g., the first communication circuit 220) of the electronic device (e.g., "NO" in operation 501), in operation 505, the second communication circuit may identify whether a shared signal has been received from the first communication circuit (e.g., the first communication circuit 220). For example, the shared signal may include information which instructs the first communication circuit (e.g., the first communication circuit 220) and the second communication circuit (e.g., the second communication circuit 230) to alternately use the antenna (e.g., the first antenna 270 of FIG. 2A) configured to support the first frequency band, or instructs the first communication circuit (e.g., the first communication circuit 220) and the second communication circuit (e.g., the second communication circuit 230) to separately use a plurality of antennas.

According to various embodiments, when the second communication circuit (e.g., the wireless communication circuit 192 or the second communication circuit 230) of the electronic device has received a shared signal from the first communication circuit (e.g., the first communication circuit 220) of the electronic device (e.g., "YES" in operation 505), in operation 507, the second communication circuit may perform control such that the first communication circuit (e.g., the first communication circuit 220) and the second communication circuit (e.g., the second communication circuit 230) share the antenna (e.g., the first antenna 270 of FIG. 2A) configured to support the first frequency band. According to an embodiment, as shown in FIG. 7, when service priorities of the second communication circuit 230 and the first communication circuit 220 are equal to P2 (e.g., operation 700), the second communication circuit 230 may receive a shared signal from the first communication circuit 220. For example, the second communication circuit 230 may determine that the first communication circuit 220 and the second communication circuit 230 alternately use at least one of the first antenna 270 or the third antenna 272 of FIG. 2B configured to support the first frequency band, based on the shared signal. For example, as shown in FIG. 7, the second communication circuit 230 may control the plurality of switches 240 to 246 such that at least one of the first antenna 270 or the third antenna 272 is connected to the second communication circuit 230 during a first reference time 710. As shown in FIG. 7, the second communication circuit 230 may control the plurality of switches 240 and 242 such that at least one of the first antenna 270 or the third antenna 272 is connected to the first communication circuit 220 during a second reference time 720. For example, the second communication circuit 230 may determine that the first communication circuit 220 and the second communication circuit 230 separately use the first antenna 270 and the third antenna 272 of FIG. 2B configured to support the first frequency band, based on the shared signal. For example, the second communication circuit 230 may control the first switch 240 and the second switch 242 such that the first antenna 270 (or the third antenna 272) is connected to the second communication circuit 230. The second communication circuit 230 may control the third switch 244 such that the third antenna 272 (or the first antenna 270) is connected to the first communication circuit 220.

According to various embodiments, when the second communication circuit (e.g., the wireless communication module 192 or the second communication circuit 230) of the electronic device has received a connection rejection signal from the first communication circuit (e.g., the first communication circuit 220) of the electronic device (e.g., "No" in operation 505), in operation 509, the second communication circuit may identify whether the number of transmissions of the service priority is greater than or equal to a reference number (or the maximum number of transmissions). For example, the number of transmissions of the service priority may include the number of times the second communication circuit 230 transmitted the service priority of the second communication circuit 230 to the first communication circuit 220 for use of the antenna configured to support the first frequency band. According to an embodiment, the second communication circuit 230 may control the plurality of switches 240 to 246 to connect the first antenna 270 and the first communication circuit 220, based on the connection rejection signal. The second communication circuit 230 may identify whether the number of transmissions of the service priority is greater than or equal to the reference number (or the maximum number of transmissions) in a state in which the first antenna 270 and the first communication circuit 220 are connected to each other.

According to various embodiments, when the number of transmissions of the service priority is less than the reference number (or the maximum number of transmissions) (e.g., "No" in operation 509), in operation 513, the second communication circuit (e.g., the wireless communication module 192 or the second communication circuit 230) of the electronic device may identify whether a reference time has elapsed after receiving the connection rejection signal. For example, the reference time may be defined or set randomly.

According to various embodiments, when the reference time has not elapsed (e.g., "No" in operation 513), the second communication circuit (e.g., the wireless communication module 192 or the second communication circuit 230) of the electronic device may identify whether the reference time has elapsed. According to an embodiment, when the second communication circuit 230 has received the connection rejection signal from the first communication circuit 220, the second communication circuit 230 may identify whether a retransmission time point of the service priority arrives.

According to various embodiments, when the reference time has elapsed (e.g., "Yes" in operation 513), in operation 515, the second communication circuit (e.g., the wireless communication module 192 or the second communication circuit 230) of the electronic device may transmit the service priority of the second communication circuit (e.g., the second communication circuit 230) to the first communication circuit (e.g., the first communication circuit 220) of the electronic device. According to an embodiment, as shown in FIG. 8, the second communication circuit 230 may transmit the service priority (e.g., P3) of the second communication circuit 230 to the first communication circuit 220 for use of the antenna (e.g., the first antenna 270 of FIG. 2A) configured to support the first frequency band (operation 800). When the second communication circuit 230 has received the connection rejection signal from the first communication circuit 220 and the reference time has elapsed, the second communication circuit 230 may retransmit the service priority of P3 to the first communication circuit 220 (operation 802 or 804).

According to various embodiments, when the number of transmissions of the service priority is greater than or equal to the reference number (or the maximum number of transmissions) (e.g., "Yes" in operation 509), the second communication circuit (e.g., the wireless communication module 192 or the second communication circuit 230) of the electronic device may update the service priority of the second communication circuit to the highest value. According to an embodiment, as shown in FIG. 8, when the second communication circuit 230 has transmitted the service priority (e.g., P3) of the second communication circuit 230 to the first communication circuit 220 as many times as the reference number (or the maximum number of transmissions), but has not received a connection approval signal (operations 800 to 804), the second communication circuit 230 may change the service priority of the second communication circuit 230 to the highest value (e.g., P1).

According to various embodiments, in operation 515, the second communication circuit (e.g., the wireless communication module 192 or the second communication circuit 230) of the electronic device may transmit the updated service priority of the second communication circuit (e.g., the second communication circuit 230) to the first communication circuit (e.g., the first communication circuit 220) of the electronic device. According to an embodiment, as shown in FIG. 8, the second communication circuit 230 may transmit the service priority of the second communication circuit 230, which is updated to P1, to the first communication circuit 220 (operation 810).

According to various embodiments, the first communication circuit (e.g., the wireless communication circuit 192 or the first communication circuit 220) of the electronic device may change a communication circuit using the antenna (e.g., the first antenna 270 of FIG. 2A) configured to support the first frequency band, based on the service priority of the first communication circuit (e.g., the first communication circuit 220). According to an embodiment, the first communication circuit 220 may determine, as the second communication circuit 230, a communication circuit for using the antenna (e.g., the first antenna 270 of FIG. 2A) configured to support the first frequency band, based on operations 401, 403, 405, 407, 409, 411, 413, 415 (which may be referred to hereinafter as operations 401 to 415 for convenience) of FIG. 4. When a service of the first communication circuit 220 is changed in a state where the antenna configured to support the first frequency band is being used by the second communication circuit 230, the first communication circuit 220 may compare the service priority of the second communication circuit 230 with a priority corresponding to the changed service of the first communication circuit 220. For example, when the service priority of the second communication circuit 230 is relatively high, the first communication circuit 220 may determine to maintain the use of the second communication circuit 230 for the antenna configured to support the first frequency band. In this case, the first communication circuit 220 may limit a service using the first communication circuit 220 until the driving of the second communication circuit 230 ends. For example, when the service priority of the first communication circuit 220 is relatively high, the first communication circuit 220 may determine that the first communication circuit 220 uses the antenna configured to support the first frequency band. In this case, the first communication circuit 220 may transmit a connection rejection signal to the second communication circuit 230. For example, when the second communication circuit 230 has received the connection rejection signal from the first communication circuit 220, the second communication circuit 230 may determine that the first communication circuit 220 uses the antenna configured to support the first frequency band. In this case, the second communication circuit 230 may control the plurality of switches 240 and 242 such that the first communication circuit 220 and the antenna configured to support the first frequency band are connected to each other. For example, when the second communication circuit 230 has received the connection rejection signal from the first communication circuit 220, the second communication circuit 230 may identify whether a second communication service (e.g., a UWB service) is maintained. When the second communication service (e.g., the UWB service) is maintained, the second communication circuit 230 may maintain a control of the plurality of switches 240 and 242 such that the connection between the second communication circuit 230 and the antenna configured to support the first frequency band is maintained until the second communication service (e.g., the UWB service) ends. When the second communication service (e.g., the UWB service) ends, the second communication circuit 230 may control the plurality of switches 240 and 242 such that the first communication circuit 220 and the antenna configured to support the first frequency band are connected to each other. For example, when the second communication circuit 230 has received the connection rejection signal from the first communication circuit 220, the second communication circuit 230 may control the plurality of switches 240 and 242 such that the antenna configured to support the first frequency band is connected to the first communication circuit 220.

Figure 9:
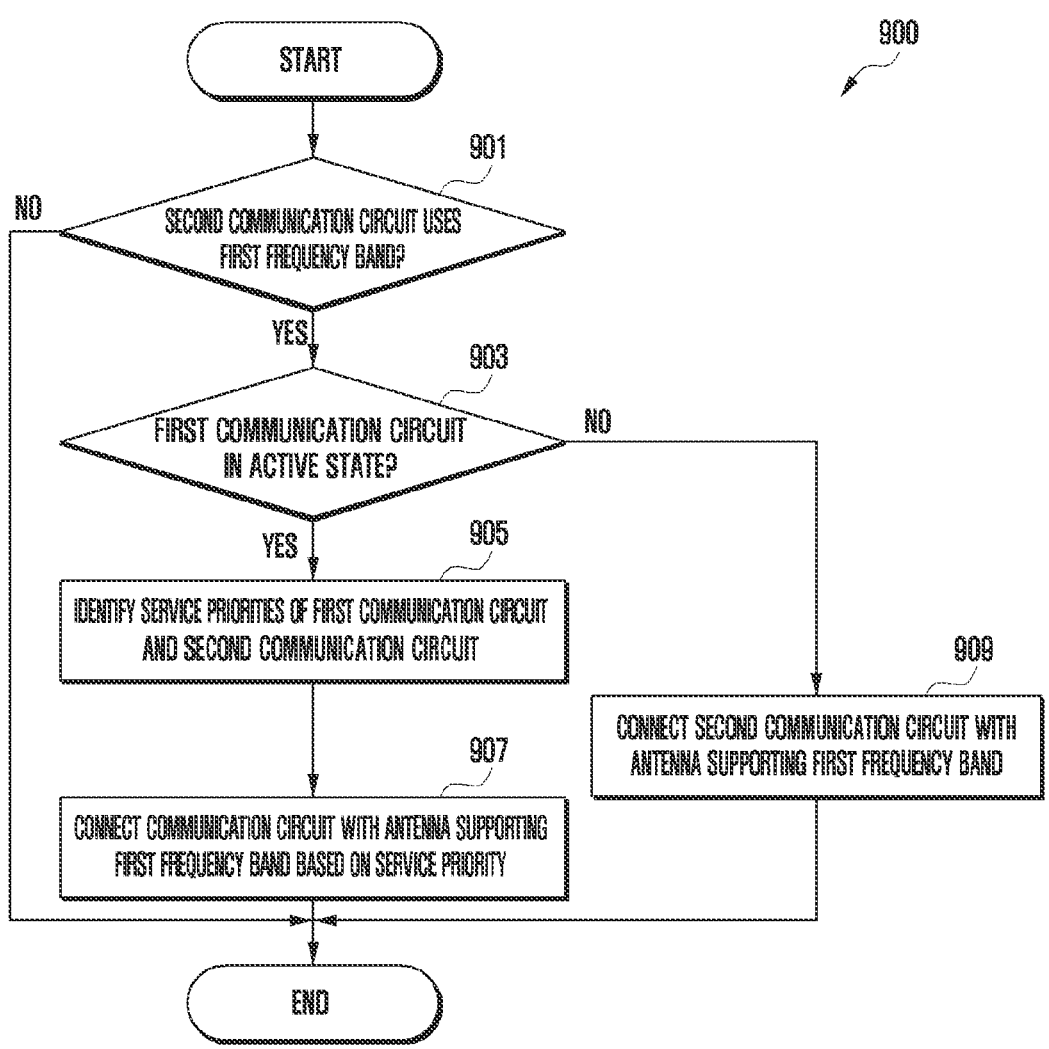
FIG. 9 is a flowchart illustrating an example operation for controlling a connection between a communication circuit and an antenna by an electronic device according to various embodiments.

FIG. 9 is a flowchart 900 illustrating an example operation for controlling a connection between a communication circuit and an antenna by an electronic device according to various embodiments. In the following embodiments, each operation may be performed sequentially, but is not necessarily performed sequentially. For example, an order of each operation may be changed, and at least two operations may be performed in parallel. For example, an electronic device may be the electronic device 101 of FIG. 1 or the electronic device 201 of FIGS. 2A to 2F.

Referring to FIG. 9, according to various embodiments, in operation 901, an electronic device (e.g., the processor 120 of FIG. 1 or the processor 210 of FIGS. 2A to 2F) may identify whether a second communication circuit (e.g., the second communication circuit 230) uses a first frequency band to provide a service. According to an embodiment, when the occurrence of an event (e.g., a key service) related to the second communication circuit 230 is detected, the processor 210 may determine whether to use the first frequency band to process the event related to the second communication circuit 230. For example, the occurrence of the event related to the second communication circuit 230 may be detected through Bluetooth or Bluetooth low power (BLE). For example, the second communication circuit may include the second communication circuit 230 of FIG. 2E, and support at least a part (e.g., 5.15 to 7.25 GHz) of the first frequency band and a second frequency band (e.g., 7.25 to 8.25 GHz).

According to various embodiments, when the second communication circuit does not use the first frequency band to provide the service (e.g., "No" in operation 901), the electronic device (e.g., the processor 120 or 210) may determine that the second communication circuit (e.g., the second communication circuit 230) uses the second frequency band (e.g., 7.25 to 8.25 GHz) to provide the service.

According to an embodiment, when the second communication circuit 230 uses the second frequency band to provide the service, the processor 210 may control a second switch 242 and/or a fourth switch 246 such that at least one of the second antenna 271 or the fourth antenna 273 of FIG. 2E, configured to support the second frequency band, is connected to the second communication circuit 230.

According to various embodiments, when the second communication circuit uses the first frequency band to provide the service (e.g., "YES" in operation 901), in operation 903, the electronic device (e.g., the processor 120 or 210) may determine whether a first communication circuit (e.g., the first communication circuit 220) is in an active state. According to an embodiment, the processor 210 may determine whether the first communication circuit 220 provides a first communication service (e.g., a Wi-Fi communication service). For example, the first communication circuit may include the first communication circuit 220 of FIG. 2E and support the first frequency band (e.g., 2.4 to 2.5 GHz and 5.15 to 7.25 GHz).

According to various embodiments, when the first communication circuit is in an inactive state (e.g., "No" in operation 903), in operation 909, the electronic device (e.g., the processor 120 or 210) may connect an antenna (e.g., the first antenna 270 or the third antenna 272 of FIG. 2E) configured to support the first frequency band with the second communication circuit (e.g., the second communication circuit 230). According to an embodiment, when the first communication circuit 220 configured to support the first frequency band does not provide the first communication service (e.g., the Wi-Fi communication service), the processor 210 may determine that the second communication circuit 230 uses the antennas 270 and 272 of FIG. 2E configured to support the first frequency band. Accordingly, the processor 210 may control a plurality of switches 240 to 246 such that at least one of the first antenna 270 or the third antenna 272 is connected to the second communication circuit 230.

According to various embodiments, when the first communication circuit (e.g., the first communication circuit 220) is in an active state (e.g., "YES" in operation 903), in operation 905, the electronic device (e.g., the processor 120 or 210) may identify service priorities of the first communication circuit (e.g., the first communication circuit 220) and the second communication circuit (e.g., the second communication circuit 230). For example, the service priority may be identified in a defined priority list corresponding to services provided by a communication circuit as shown in Table 1.

According to various embodiments, in operation 907, the electronic device (e.g., the processor 120 or 210) may selectively connect the first communication circuit (e.g., the first communication circuit 220) or the second communication circuit (e.g., the second communication circuit 230) with the antenna (e.g., the first antenna 270 or the third antenna 272 of FIG. 2E) configured to support the first frequency band, based on the service priorities of the first communication circuit (e.g., the first communication circuit 220) and the second communication circuit (e.g., the second communication circuit 230). According to an embodiment, the processor 210 may determine that a communication circuit (e.g., the first communication circuit 220 or the second communication circuit 230) having a relatively high service priority uses antennas (e.g., the antennas 270 and 272 of FIG. 2E) configured to support the first frequency band. Accordingly, the processor 210 may control the plurality of switches 240 to 246 such that at least one of the first antenna 270 or the third antenna 272 is connected to the communication circuit having a relatively high service priority. According to an embodiment, when the service priorities of the first communication circuit and the second communication circuit are the same, the processor 210 may control the plurality of switches 240 to 246 such that at least one of the first antenna 270 or the third antenna 272 is alternately connected to the first communication circuit 220 and the second communication circuit 230.

Figure 10:
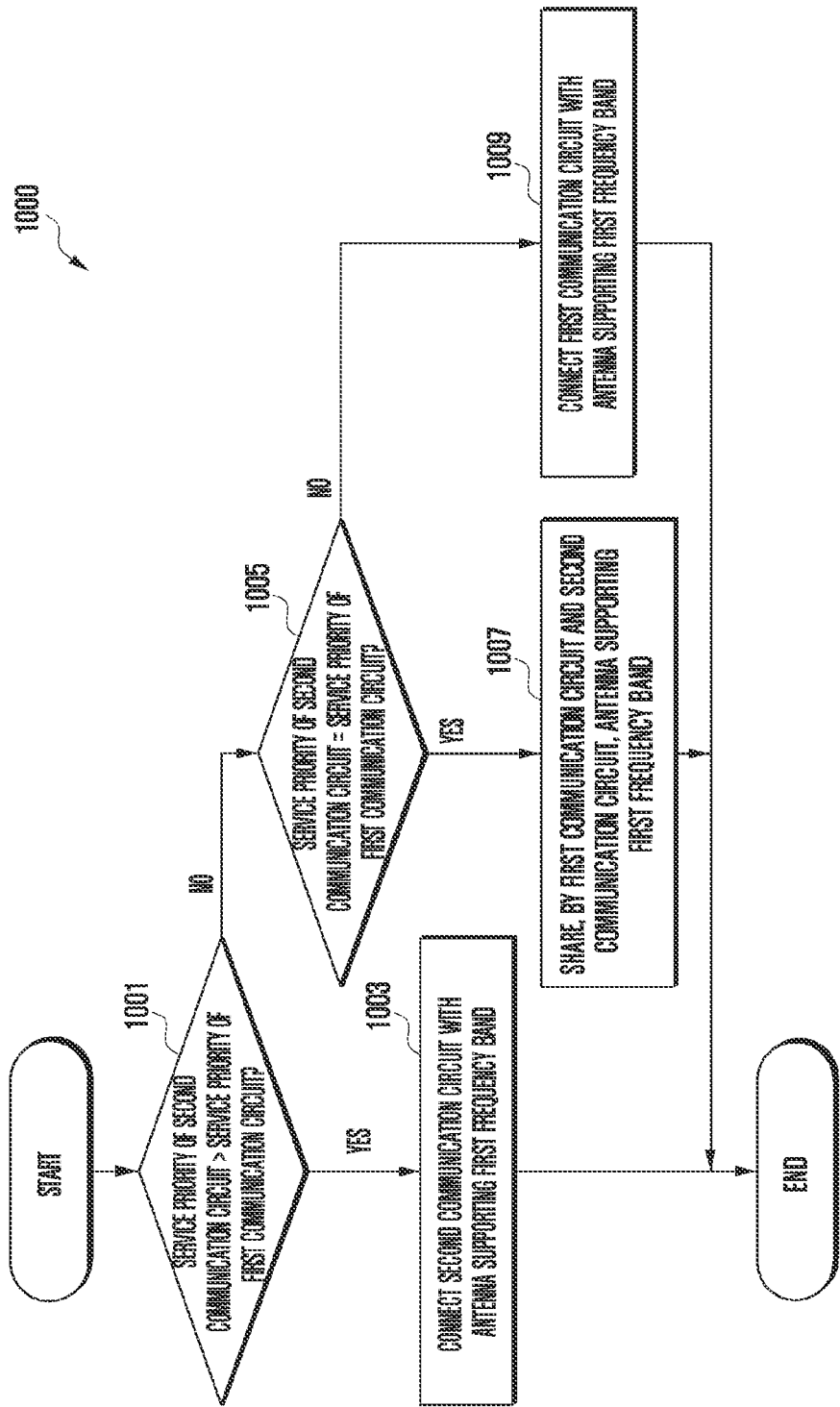
FIG. 10 is a flowchart illustrating an example operation for connecting a first communication circuit or a second communication circuit to an antenna by an electronic device according to various embodiments.

FIG. 10 is a flowchart 1000 illustrating an example operation for connecting a first communication circuit or a second communication circuit to an antenna by an electronic device according to various embodiments. The operations of FIG. 10 described below may include, for example, detailed operations of operation 907 of FIG. 9. In the following embodiments, each operation may be performed sequentially, but is not necessarily performed sequentially. For example, an order of each operation may be changed, and at least two operations may be performed in parallel. For example, an electronic device may be the electronic device 101 of FIG. 1 or the electronic device 201 of FIGS. 2A to 2F.

Referring to FIG. 10, according to various embodiments, in operation 1001, an electronic device (e.g., the processor 120 of FIG. 1 or the processor 210 of FIGS. 2A to 2F) may identify whether a service priority of a second communication circuit (e.g., the second communication circuit 230) is relatively higher than a service priority of a first communication circuit (e.g., the first communication circuit 220).

According to various embodiments, when the service priority of the second communication circuit (e.g., the second communication circuit 230) is relatively higher than the service priority of the first communication circuit (e.g., the first communication circuit 220) (e.g., "YES" in operation 1001), in operation 1003, the electronic device (e.g., the processor 120 or 210) may connect an antenna (e.g., the first antenna 270 or the third antenna 272 of FIG. 2E) configured to support a first frequency band with the second communication circuit (e.g., the second communication circuit 230). According to an embodiment, when the service priority of the second communication circuit 230 is P1 and the service priority of the first communication circuit 220 is P3, the processor 210 may determine that the second communication circuit 230 uses at least one of the first antenna 270 or the third antenna 272 configured to support the first frequency band. In this case, the processor 210 may control a plurality of switches 240 to 246 such that at least one of the first antenna 270 or the third antenna 272 is connected to the second communication circuit 230.

According to various embodiments, when the service priority of the first communication circuit is relatively higher than or equal to the service priority of the second communication circuit (e.g., the second communication circuit 230) (e.g., "NO" in operation 1001), in operation 1005, the electronic device (e.g., the processor 120 or 210) may identify whether the service priority of the second communication circuit (e.g., the second communication circuit 230) and the service priority of the first communication circuit (e.g., the first communication circuit 220) are the same.

According to various embodiments, when the service priority of the second communication circuit (e.g., the second communication circuit 230) and the service priority of the first communication circuit (e.g., the first communication circuit 220) are the same (e.g., "YES" in operation 1005), in operation 1007, the electronic device (e.g., the processor 120 or 210) may perform control such that the first communication circuit (e.g., the first communication circuit 220) and the second communication circuit (e.g., the second communication circuit 230) share the antenna (e.g., the first antenna 270 or the third antenna 272 of FIG. 2E) configured to support the first frequency band. According to an embodiment, when the service priorities (e.g., P3) of the first communication circuit 220 and the second communication circuit 230 are the same, the processor 210 may determine that the first communication circuit 220 and the second communication circuit 230 alternately use at least one of the first antenna 270 or the third antenna 272 configured to support the first frequency band. Accordingly, the processor 210 may control the plurality of switches 240 to 246 such that at least one of the first antenna 270 or the third antenna 272 is connected to the second communication circuit 230 during a first reference time. The processor 210 may control the first switch 240 and/or the third switch 244 such that the first communication circuit 220 is connected to at least one of the first antenna 270 or the third antenna 272 during a second reference time. According to an embodiment, when the service priorities (e.g., P3) of the first communication circuit 220 and the second communication circuit 230 are the same, the processor 210 may determine that the first communication circuit 220 and the second communication circuit 230 separately use the first antenna 270 and the third antenna 272 configured to support the first frequency band. Accordingly, the processor 210 may control the first switch 240 and the second switch 242 such that the first antenna 270 (or the third antenna 272) and the second communication circuit 230 are connected to each other. The processor 210 may control the third switch 244 such that the third antenna 272 (or the first antenna 270) and the first communication circuit 220 are connected to each other.

According to various embodiments, when the service priority of the first communication circuit (e.g., the first communication circuit 220) is relatively higher than the service priority of the second communication circuit (e.g., the second communication circuit 230) (e.g., "NO" in operation 1005), in operation 1009, the electronic device (e.g., the processor 120 or 210) may connect the antenna (e.g., the first antenna 270 or the third antenna 272 of FIG. 2E) configured to support the first frequency band with the first communication circuit (e.g., the first communication circuit 220). According to an embodiment, when the service priority of the second communication circuit 230 is P3 and the service priority of the first communication circuit 220 is P2, the processor 210 may determine that the first communication circuit 220 uses at least one of the first antenna 270 or the third antenna 272 configured to support the first frequency band. In this case, the processor 210 may control the first switch 240 and/or the third switch 244 such that at least one of the first antenna 270 or the third antenna 272 is connected to the first communication circuit 220.

According to various embodiments, an electronic device (e.g., the processor 120 or 210) may change a communication circuit occupying an antenna (e.g., the first antenna 270 or the third antenna 272 of FIG. 2E) configured to support a first frequency band, based on a change in a service priority of the communication circuit. According to an embodiment, when a service priority of a first communication circuit 220 is relatively high, a processor 210 may control at least one of a first switch 240 or a third switch 244 such that at least one of a first antenna 270 or a third antenna 272 is connected to the first communication circuit 220. For another example, when a service having a priority of P1 is provided through a second communication circuit 230 using channel 5 or channel 6 (e.g., the first frequency band), the processor 210 may control a plurality of switches 240 to 246 such that at least one of the first antenna 270 or the third antenna 272 is connected to the second communication circuit 230.

According to various example embodiments, a method of operating an electronic device (e.g., the electronic device 101 of FIG. 1 or the electronic device 201 of FIGS. 2A to 2F) including a first communication circuit configured to support a first frequency band, and a second communication circuit (e.g., the wireless communication module 192 of FIG. 1 or the second communication circuit 230 of FIGS. 2A to 2F) operatively connected to the first communication circuit (e.g., the wireless communication module 192 of FIG. 1 or the first communication circuit 220 of FIGS. 2A to 2F) and configured to support at least a part of the first frequency band and a second frequency band may include: identifying, using the second communication circuit, whether the second communication circuit uses the first frequency band; and based on the second communication circuit using the first frequency band, selectively connecting a first antenna configured to support the first frequency band with one of the first communication circuit or the second communication circuit.

According to various example embodiments, the selectively connecting may include: based on the second communication circuit using the first frequency band, providing, by the second communication circuit, information related to a service priority of the second communication circuit to the first communication circuit; and selectively connecting the first antenna with one of the first communication circuit or the second communication circuit, based on a control signal provided from the first communication circuit.

According to various example embodiments, the method may further include: based on a service priority of the first communication circuit being relatively higher than a service priority of the second communication circuit, transmitting, by the first communication circuit, a control signal for a connection between the first antenna and the first communication circuit to the second communication circuit; based on the service priority of the second communication circuit being relatively higher than the service priority of the first communication circuit, transmitting a control signal for a connection between the first antenna and the second communication circuit to the second communication circuit; and based on the service priorities of the first communication circuit and the second communication circuit being the same, transmitting a control signal for alternately connecting the first antenna with the first communication circuit and the second communication circuit to the second communication circuit.

According to various example embodiments, the method may further include, based on the first communication circuit not providing a service, transmitting, by the first communication circuit, a control signal for a connection between the first antenna and the second communication circuit to the second communication circuit.

According to various example embodiments, the providing to the first communication circuit may include: based on the first antenna and the first communication circuit being connected to each other based on the control signal, re-providing, by the second communication circuit, information related to the service priority of the second communication circuit to the first communication circuit; based on the number of transmissions of the information related to the service priority of the second communication circuit satisfying a specified condition, updating the service priority of the second communication circuit; and providing information related to the updated service priority of the second communication circuit to the first communication circuit.

According to various example embodiments, the method may further include, based on the second communication circuit using the second frequency band, connecting, by the second communication circuit, a second antenna configured to support the second frequency band with the second communication circuit.

According to various example embodiments, the first communication circuit may include a communication circuit using a wireless fidelity (Wi-Fi) communication scheme, and the second communication circuit may include a communication circuit using an ultra-wideband (UWB) communication scheme.

According to various example embodiments, the first antenna may support a band of 2.4 GHz to 7.25 GHz, and the second antenna may support a band of 7.25 GHz to 8.5 GHz.

According to various example embodiments, the second communication circuit may support a band of 6.25 GHz to 7.25 GHz which is at least a part of the first frequency band, and a band of 7.25 GHz to 8.25 GHz which is the second frequency band.

According to various example embodiments, an electronic device may be configured to selectively connect an antenna supporting an overlapping frequency band of a plurality of communication circuits to one of the plurality of communication circuits, to reduce performance degradation due to frequency collision of the plurality of communication circuits.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device comprising:
 a first communication circuit configured to support a first frequency band;
 a second communication circuit configured to support at least a part of the first frequency band and a second frequency band different from the first frequency band;
 a first switch;
 a second switch;
 a first antenna electrically connected to the first switch and configured to support the first frequency band; and
 a second antenna electrically connected to the second switch and configured to support the second frequency band,
 wherein the first communication circuit is configured to be connected to the first antenna via at least the first switch, and the second communication circuit is configured to be connected to the second antenna via at least the second switch, based on use of the second frequency band by the second communication circuit,
 wherein the second communication circuit is configured to be connected to the first antenna via at least the first switch and the second switch based on use of the part of the first frequency band by the second communication circuit.

2. The electronic device of claim 1, wherein the first communication circuit is configured to select the first communication circuit or the second communication circuit as a communication circuit for using the first antenna based on information relating to a priority of the first communication circuit and the second communication circuit, based on use of the part of the first frequency band by the second communication circuit.

3. The electronic device of claim 2, wherein based on a priority of the first communication circuit being relatively higher than a priority of the second communication circuit, the first communication circuit is configured to transmit, to the second communication circuit, a control signal for connection of the first antenna and the first communication circuit.

4. The electronic device of claim 2, wherein based on a priority of the second communication circuit being relatively higher than a priority of the first communication circuit, the first communication circuit is configured to transmit, to the second communication circuit, a control signal for connection of the first antenna and the second communication circuit.

5. The electronic device of claim 2, wherein based on respective priorities of the first communication circuit and the second communication circuit being the same, the first communication circuit is configured to transmit, to the second communication circuit, a control signal for alternately connecting the first antenna to the first communication circuit and the second communication circuit.

6. The electronic device of claim 2, wherein based on the first communication circuit not providing a service, the first communication circuit is configured to transmit, to the second communication circuit, a control signal for connection of the first antenna and the second communication circuit.

7. The electronic device of claim 2, wherein based on the first antenna and the first communication circuit being connected to each other based on a control signal, the second communication circuit is configured to provide information related to priority of the second communication circuit to the first communication circuit.

8. The electronic device of claim 2, wherein based on a number of transmissions of the information related to priority of the second communication circuit satisfying a specified condition, the second communication circuit is configured to update priority of the second communication circuit, and to provide information related to the updated priority of the second communication circuit to the first communication circuit.

9. The electronic device of claim 1, wherein the first communication circuit is configured to support a wireless fidelity (Wi-Fi) communication scheme, and the second communication circuit is configured to support an ultra-wideband (UWB) communication scheme.

10. The electronic device of claim 1, wherein the first antenna is configured to support a band of 2.4 GHz to 7.25 GHz, and the second antenna is configured to support a band of 7.25 GHz to 8.5 GHz.

11. The electronic device of claim 1, further comprising;
 a processor operatively connected to the first communication circuit and the second communication circuit,
 wherein the processor is configured to select the first communication circuit or the second communication circuit as a communication circuit for using the first antenna based on information relating to a priority of the first communication circuit and the second communication circuit, based on use of the part of the first frequency band by the second communication circuit.

12. A method of operating an electronic device comprising a first communication circuit configured to support a first frequency band, and a second communication circuit configured to support at least a part of the first frequency band and a second frequency band different from the first frequency band, the method comprising:
- identifying whether the second communication circuit uses the first frequency band;
- based on use of the part of the first frequency band by the second communication circuit, connecting a first antenna configured to support the first frequency band with the second communication circuit; and
- based on use of the second frequency band by the second communication circuit, connecting the first communication circuit to the first antenna and connecting the second communication circuit to a second antenna configured to support the second frequency band.

13. The method of claim 12, further comprising:
- based on use of the part of the first frequency band by the second communication circuit, selecting, by the first communication circuit or a processor of the electronic device, the first communication circuit or the second communication circuit as a communication circuit for using the first antenna based on information relating to a priority of the second communication circuit received from the second communication circuit.

14. The method of claim 13, wherein the selecting the first communication circuit or the second communication circuit comprise:
- based on priority of the first communication circuit being relatively higher than priority of the second communication circuit, selecting the first communication circuit as the communication circuit for using the first antenna;
- based on priority of the second communication circuit being relatively higher than priority of the first communication circuit, selecting the second communication circuit as the communication circuit for using the first antenna.

15. The method of claim 13, wherein the selecting the first communication circuit or the second communication circuit comprise:
- based on the priorities of the first communication circuit and the second communication circuit being the same, alternately selecting the first communication circuit and the second communication circuit as the communication circuit for using the first antenna.

16. The method of claim 13, wherein the selecting the first communication circuit or the second communication circuit comprise;
- based on the first communication circuit not providing a service, selecting the second communication circuit as the communication circuit for using the first antenna.

17. The method of claim 13, further comprising;
- based on the first antenna and the first communication circuit being connected to each other based on the control signal, providing, by the second communication circuit, the information related to the priority of the second communication circuit to the first communication circuit;
- based on a number of transmissions of the information related to the priority of the second communication circuit satisfying a specified condition, updating the priority of the second communication circuit; and
- providing information related to the updated priority of the second communication circuit to the first communication circuit.

18. The method of claim 12, wherein the first communication circuit comprises a communication circuit using a wireless fidelity (Wi-Fi) communication scheme, and
- wherein the second communication circuit comprises a communication circuit using an ultra-wideband (UWB) communication scheme.

19. The method of claim 12, wherein the first antenna is configured to support a band of 2.4 GHz to 7.25 GHz, and
- wherein the second antenna is configured to support a band of 7.25 GHz to 8.5 GHz.

20. The method of claim 19, wherein the second communication circuit is configured to support a band of 6.25 GHz to 7.25 GHz which is at least a part of the first frequency band, and a band of 7.25 GHz to 8.25 GHz which is the second frequency band.

* * * * *